United States Patent [19]

Hudimac

[11] Patent Number: 4,908,536
[45] Date of Patent: Mar. 13, 1990

[54] VIBRATION SUPPRESSING BY ELECTRICAL TERMINATION IMPEDANCE

[76] Inventor: Albert A. Hudimac, 12100 Devilwood Dr., Rockville, Md. 10845

[21] Appl. No.: 148,428

[22] Filed: Jan. 25, 1988

Related U.S. Application Data

[63] Continuation-in-part of Ser. No. 793,058, Oct. 30, 1985, Pat. No. 4,816,725.

[51] Int. Cl.$^4$ .......................... G01D 15/00; H02K 5/24
[52] U.S. Cl. .......................................... 310/51; 310/15; 318/114; 318/128
[58] Field of Search ............................ 52/167; 74/574; 248/550, 560, 610; 310/51, 15; 318/114, 128, 127

[56] References Cited

U.S. PATENT DOCUMENTS

| | | | |
|---|---|---|---|
| 4,083,433 | 4/1978 | Geohegan et al. | 310/51 |
| 4,595,166 | 6/1986 | Kurokawa | 248/550 |
| 4,713,939 | 12/1987 | Keith | 310/15 |
| 4,816,725 | 3/1989 | Hudimac | 318/114 |

Primary Examiner—Patrick R. Salce
Assistant Examiner—D. L. Rebsch
Attorney, Agent, or Firm—James Creighton Wray

[57] ABSTRACT

The electrical termination impedance of a variable reluctance electro-mechanical transducer is changed automatically in response to the frequency of vibration applied to the transducer, to provide the optimum electrical termination impedance which produces the highest effective mechanical impedance at said frequency. The transducer includes magnetic cores interconnected by a spring formed by cutting a relatively thin medial annulus in a relatively thick flat disk. A digital logic circuit uses a signal counter and NAND gates to determine the frequency and close the appropriate fast-acting relay in a parallel array of capacitor-relays. A negative-impedance electrical termination provides a high mechanical impedance over a broad band of frequencies. A shunting circuit eliminates spurious resonances by providing substantially no shunting in the transducer-terminating circuit at resonant frequency, and substantial shunting in the terminating circuit at other frequencies.

17 Claims, 26 Drawing Sheets

FIG. 10A

| ID | NAME | PKG | Vcc | GND | NO | N.C. |
|---|---|---|---|---|---|---|
| A | PROG. COUNTER | 16 | 15 | 9 | XR 2240 | 1,2,8,10 |
| B | NAND GATE | 14 | 14 | 7 | CD 4012 | 6,8 |
| C | SCHMITT HEX INV | 14 | 14 | 7 | 74LS14 | |
| D | QUAD NOR GATE | 14 | 14 | 7 | 74LS02 | 2,3,5,6 |
| E | PROG COUNTER | 16 | 15 | 9 | XR 2240 | 1,2,8,10 |
| F | DUAL MONO MVB | 16 | 14 | 8 | 74LS123 | |
| G | LATCH | 14 | 5 | 12 | 74LS75 | 7 |
| H | DECODER | 16 | 16 | 8 | 74LS42 | |
| J | HEX INV | 16 | 1 | 8 | CD4049 | 13,16 |
| K | QUAD DRIVER | " | " | " | " | " |
| L | " | 14 | 11 | 4 | 75492 | |
| N | 16 PIN SOCKET | " | " | " | " | 2,9 |
| O | OP AMP | 8 | 7 | 4 V | CA3130 | 5 |
| OO | " | " | " | " | " | " |
| P | POWER CONV | 8 | | | 7660 | |

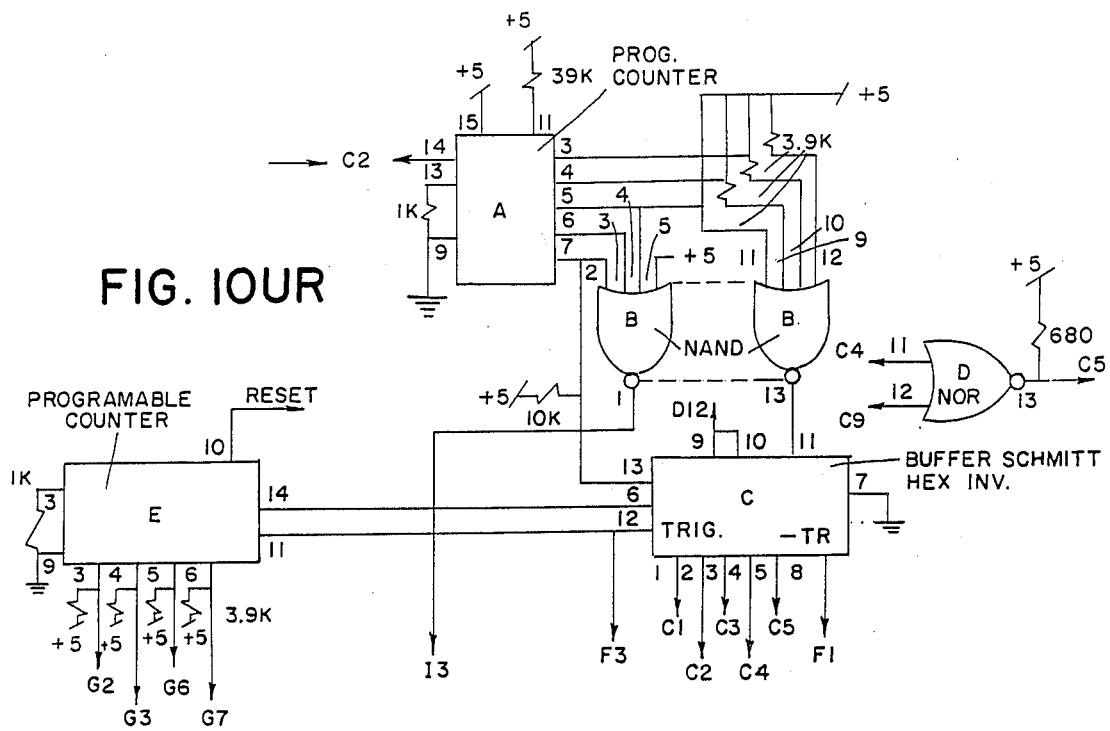
FIG. IOUR
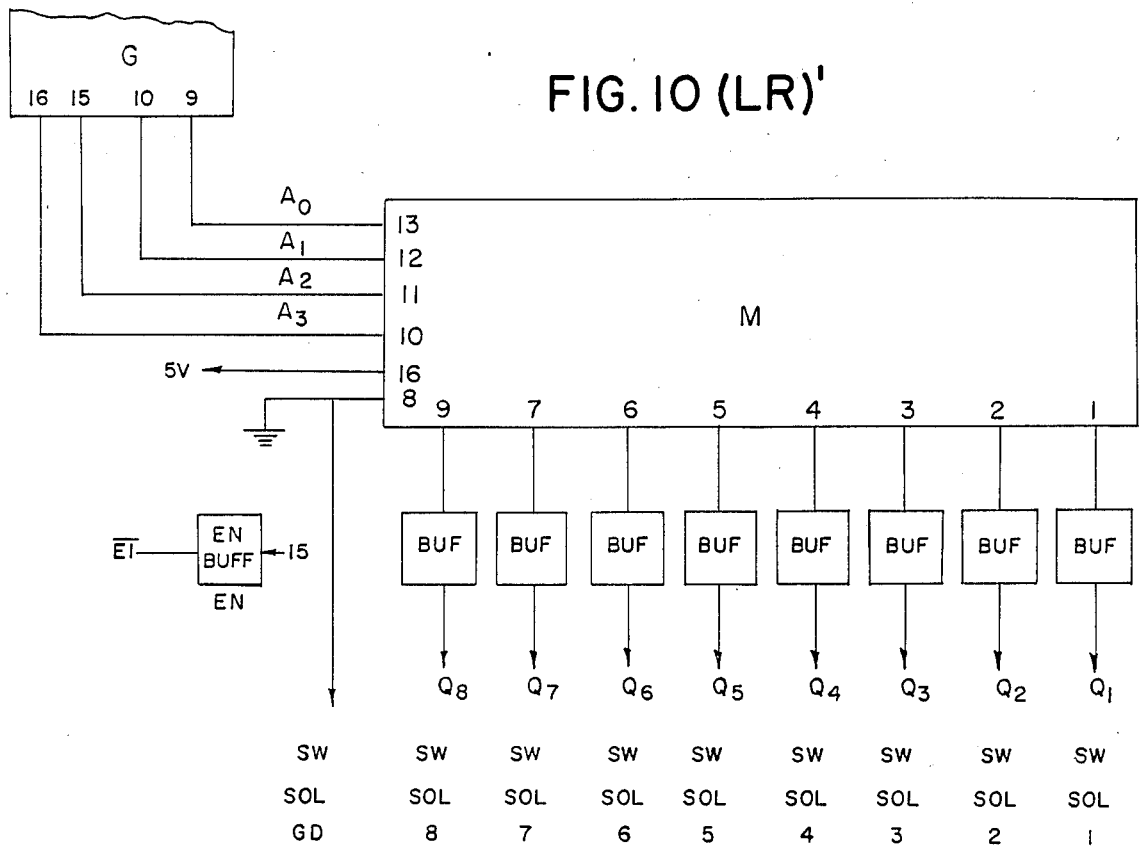
FIG. IO (LR)'

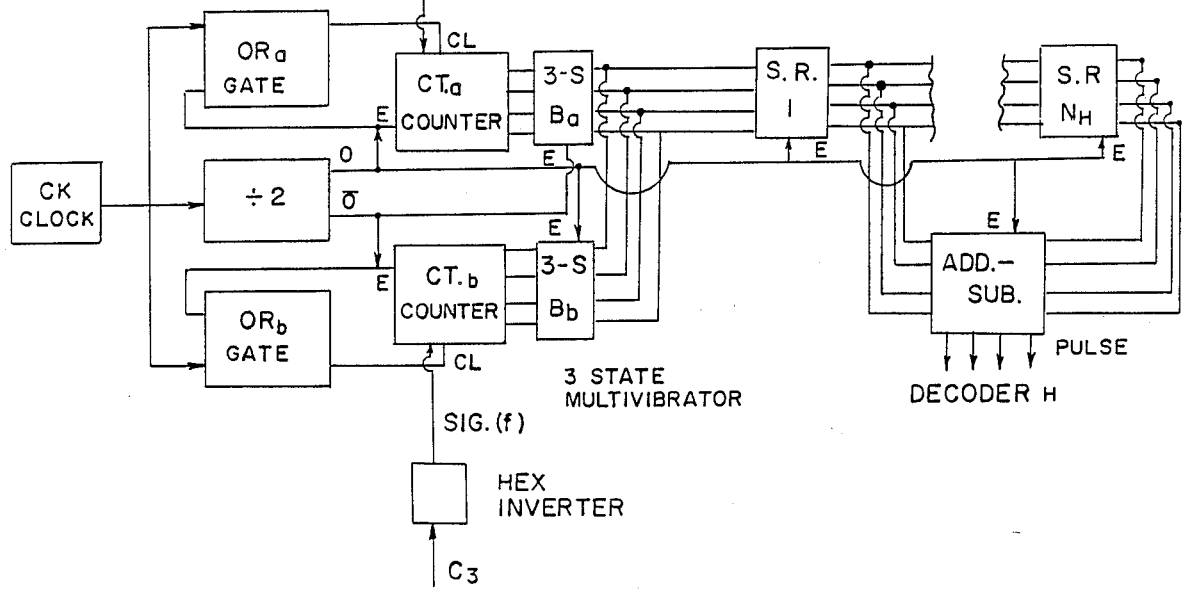
FIG. 10 (UR)'
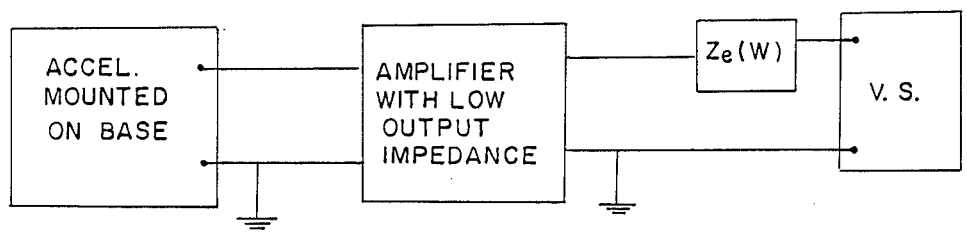
FIG. 22

VIBRATION SUPPRESSING BY ELECTRICAL TERMINATION IMPEDANCE

This is a continuation in part of U.S. Ser. No. 793,058 filed Oct. 30, 1985, now U.S. Pat. No. 4,816,725.

BACKGROUND OF THE INVENTION

This invention relates generally to the control of mechanical vibration and more particularly has reference to the extensions and improvements of the vibration suppressor.

The extension is directed at solving the problem of automatically controlling the V.S. to provide the maximum impedance at the mounting point which is being driven by an oscillatory force whose frequency changes slowly with time. (I A, B, C).

This invention is an improvement on my previous invention disclosed in U.S. Pat. No. 3,088,062, for Electromechanical Vibratory Force Suppressor and Indicator, the disclosure of which is incorporated herein by reference. The specification for that patent describes a mechanical circuit (usually a spring s and a mass m in parallel) and a transducer with a particular external electrical termination $Z_e$ which has been selected by the operator (based on his estimation of the instantaneous frequency f which he enters into a previously determined "$Z_e$vsf" chart). The electrical termination may be at a remote point. The transducer transforms the total electrical impedance composed of the blocked impedance $Z_T$ of the transducer in series with the external electrical impedance $Z_e$ into a virtual mechanical element whose impedance is $Z_v$. This is shown in FIG. 1 (a copy of FIG. 1a of the patent) in an equivalent electrical circuit where F is the open circuit force of the noise source, $Z_i$ is the internal impedance of the noise source, $Z_b$ is the impedance of the base on which the noise source rests and G is the electromechanical coupling constant. As $Z_e$ changes, the resulting $Z_v$ will change the antiresonant frequency of the V.S., at which frequency the mechanical impedance at the base F/vb will remain very high. But, at first, magnitude of the impedance decreases as the shift in the antiresonant frequency increases. The theoretical basis of FIG. 1 is demonstrated in the *Analysis* portion of the Patent, Cols. 4, 5, 6, 7, and was verified with the experimental setup shown in FIG. 2 (Patent FIG. 1a) in which the vibration suppressor was mounted on a thin plate, supported on pillow blocks and which was driven by a ballistically suspended shaker unit. The pillow blocks were mounted on a heavy horizontal baseplate. The results are given in FIG. 3 (similar to Patent FIG. 18) in which the experimentally determined optimum external capacitances (o) at discrete frequencies are compared with the theoretical curve (—). In an experiment using the setup of FIG. 2, the relative velocity of suppression was determined as a function of frequency, the external terminating capacitance at each frequency being given by FIG. 3. The results are plotted in FIG. 4 (similar to Patent FIG. 17). If, on the other hand, a fixed external termination capacitor is used regardless of frequency, a greatly reduced velocity may be achieved at the frequency for which the given capacitor is the optimum termination, but, as the frequency moves either up or down, the velocity increases and may become larger than for the velocity without a suppressor (or dynamic absorber). The frequency-response curve is then said to have "EARS".

Results (—) are plotted in FIG. 5 for case without velocity control; it has a strong peak in velocity curve at a frequency as shown. For a vibration suppressor terminated optimally at this frequency, the response curve (- - -) shows a strong attenuation in velocity at that frequency, and the appearance of "EARS".

The kind of results obtained in FIG. 4 on a frequency-by-frequency basis can be obtained simultaneously over as wide a band of frequency as that over which the correct electrical termination can be achieved. FIG. 6 (corresponding to Patent FIG. 13) gives a positive feedback circuit of the "series" type for obtaining broadband electrical termination.

A point is reached at which increasing the bandwidth is no longer productive, as may be seen in FIG. 12. A simpler, more stable circuit that can provide proper termination over the effective bandwidth would be more useful.

The vibration suppressor, with or without the line-following capability, is basically a dynamic absorber combined with a transducer in such a way that its electrical termination is transformed to a virtual mechanical element that then operates as part of the dynamic absorber. The efficacy of the vibration suppressor depends on making the energy loss of both the mechanical and the electromagnetic parts as small as possible. Thus, most of the quasiharmonic noise force has been cancelled, leaving a small net foundation velocity. This can be reduced much further by also using a negative-feedback velocity-control; this composite can be much more effective than the usual feedback alone. The negative feedback must be so applied that it does not interfere with the V.S. process.

Some of the transducer types considered for use with a mechanical antiresonant device in a V.S. exhibit non-linear behavior. Push-pull arrangements have been used for (electrically driven) electrostatic speakers, and perhaps even for variable reluctance drivers. But what is proposed here is the inverse—to have a vibratory noise force applied to a push-pull transducer (e.g. variable reluctance type) at the mounting point. This will result in much greater linearity and in providing a more effective and cheaper dc current source for the large dc magnetic-field bias that is required.

OBJECTS OF THE INVENTION

The object of this invention is to extend the means of controlling mechanical vibration provided by the V.S. by providing means for automatically and optimally changing the electrical termination of the transducer portion of the V.S. as the instantaneous frequency of the deleterious oscillatory force changes slowly with time to provide the maximum mechanical impedance at the mounting point. The object is to estimate the frequency, use logic to select the corresponding electrical impedance, and actuate the means to effect its insertion in the transducer output.

Further objects of this invention are to decrease the response time of the automatic termination, and to provide a means of selecting the proper corresponding electrical-impedance termination from a standard set of capacitors.

Another object of this invention is to eliminate spurious resonances by including a selective damping circuit in series with the regular electrical termination. The damping circuit provides practically no damping at the antiresonant frequency of the V.S. so that the performance at that frequency is not reduced. However, the damping circuit provides substantial damping at other than resonant frequencies so that the effective Q of the V.S. and foundation at the spurious (series) resonance is lowered, thus strongly moderating the spurious oscillation. The object here is to provide alternative means to accomplish this; a filter created with a feedback amplifier, and filters that use no electronics.

Another object of this invention is to provide an electrical termination that is simpler and more stable than that disclosed in the earlier patent, and yet will cover the frequency band over which the V.S. remains effective.

Another object here is to modify the electrical terminating circuit by adding a judicious amount of negative resistance.

Another object of this invention is to generalize the L.F.V.S. by creating a composite velocity control device in which a L.F.V.S. and a negative feedback control means are employed together. A further object is to combine a V.S. with a negative resistance judiciously (not a feedback control device).

Another object of this invention is to provide a means of applying the original source of mechanical force in a push-pull manner to increase the linearity of the L.F.V.S..

It is further the object of this invention to utilize this means to provide a more effective, cheaper dc source of current for the generation of the dc magnetic-bias.

These and other and further objects and features of the invention are apparent in the disclosure which includes the above and below specification and claims and drawings.

BRIEF DESCRIPTION OF THE DRAWINGS

FIG. 10 L.L. tabulates parts and connections in FIG. 10.

FIG. 10 L.R., (L.R.)' is a circuit for an alternative method (binary) of using the estimated frequency of oscillation to select the corresponding capacitor for the electrical termination of the transducer.

FIG. 10 U.R., (U.R.)' is the circuit for the alternative way to estimate the (instantaneous) frequency of mechanical vibration.

FIG. 13a' shows that shunt 1 is lumped resistance of appropriate size; shunt 2 is a multiple tuned shunt, with appropriate damping.

FIG. 15b is a graph of the impedance of the variable shunt shown in FIG. 15a.

FIG. 22 is a block diagram for velocity control using composite of vibration suppressor and negative feedback through the external electrical termination of the vibration suppressor.

DETAILED DESCRIPTION OF THE INVENTION

I. Line-Following Vibration Suppressor

A.

Figure 5:
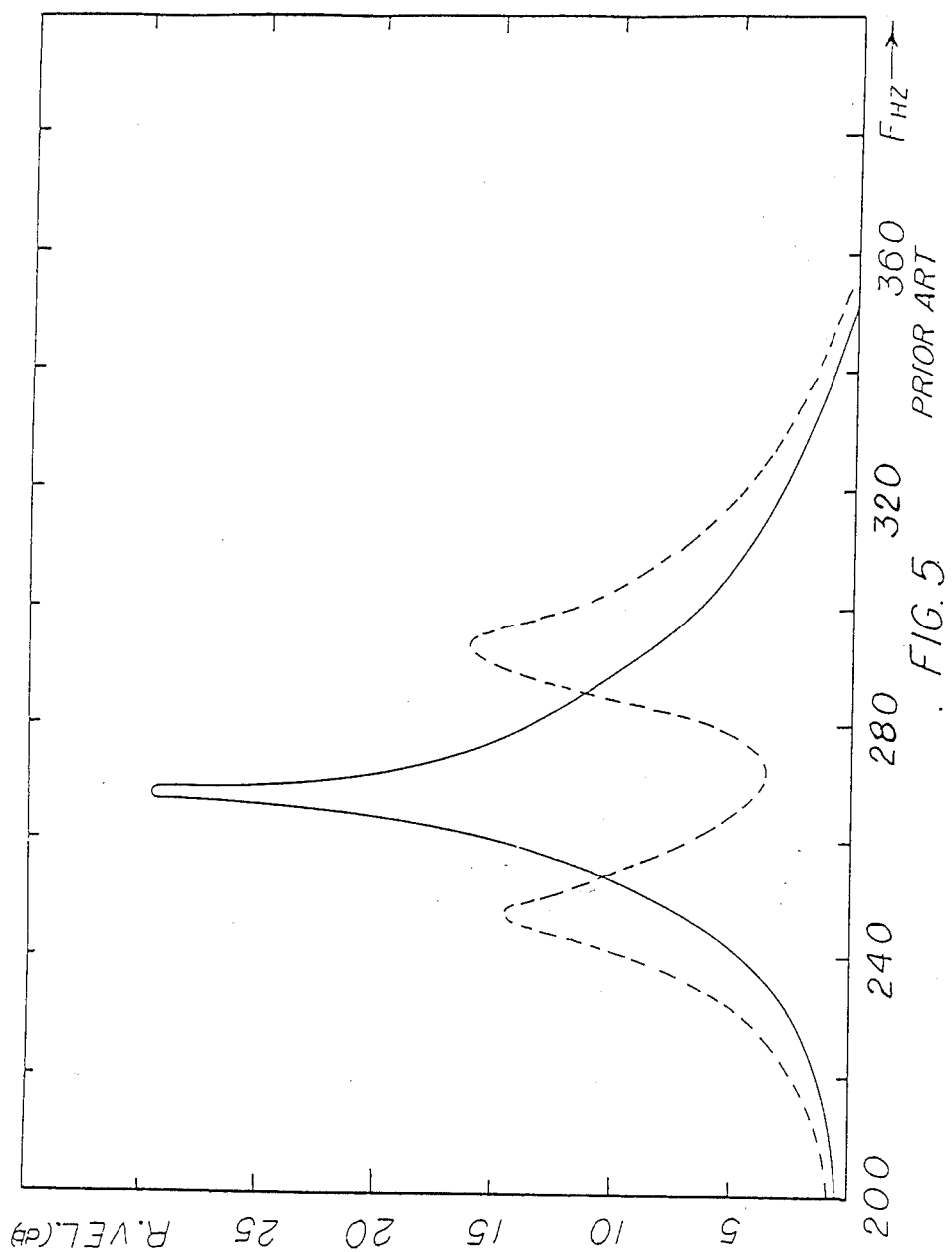
FIG. 5 is a graphical comparison of the vibration velocity of a non-suppressed vibration source versus the vibration velocity of a vibration source provided with a known vibration suppressor having a fixed external termination impedance.

There are important cases of vibration for which the principal component in the frequency spectrum of the force disturbance is a line or, more importantly, a quasi-line whose frequency changes slowly with time. If the frequency was independent of time, a conventional dynamic absorber would work very well, provided the Q was high enough. But, if the frequency changes even a relatively small amount, there will be a very noticeable drop in performance, as shown in FIG. 5.

Figure 3:
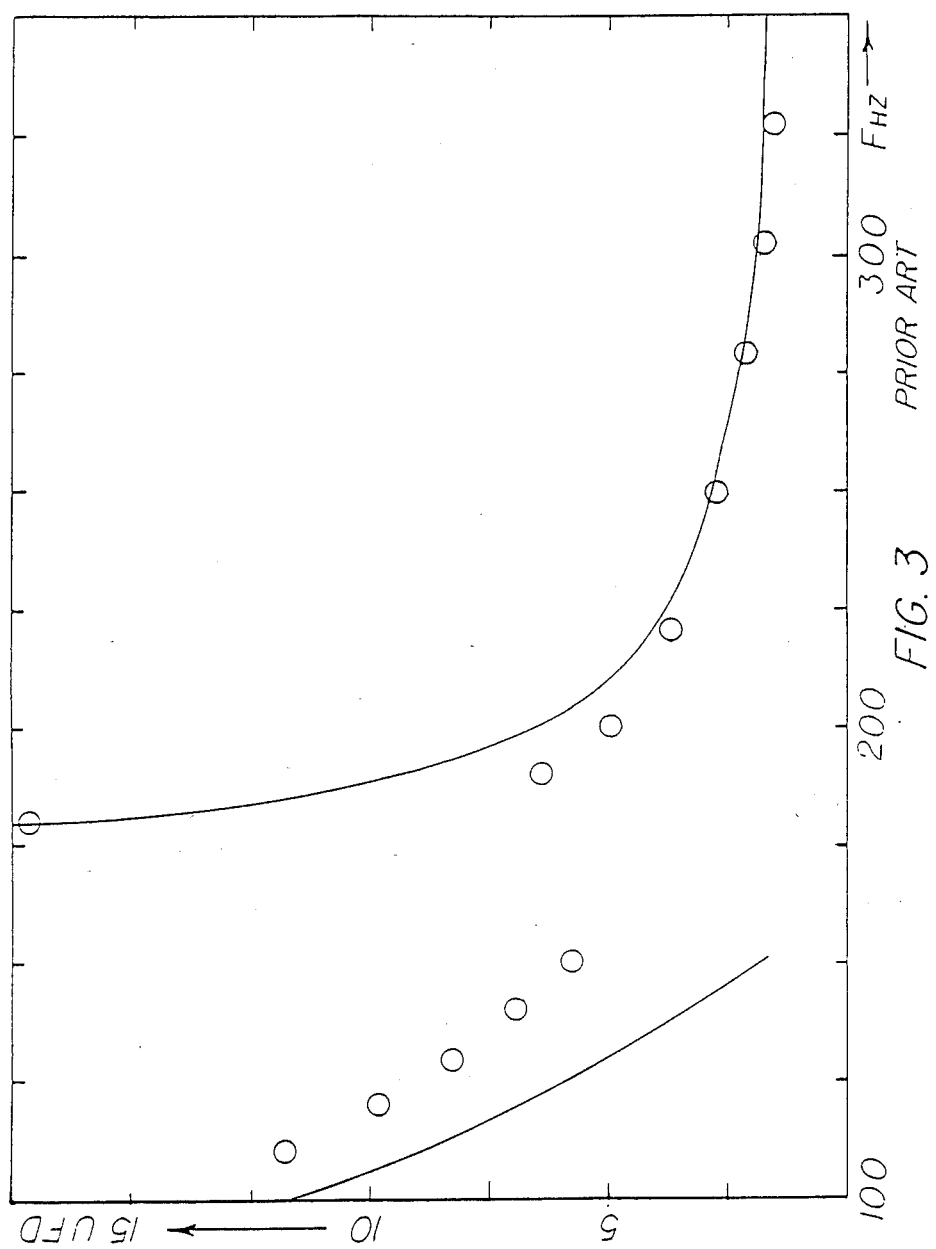
FIG. 3 is a graphical illustration showing the optimum external capacitances determined experimentally at a number of frequencies with a known vibration suppressor, and compared with a theoretical curve.
Figure 4:
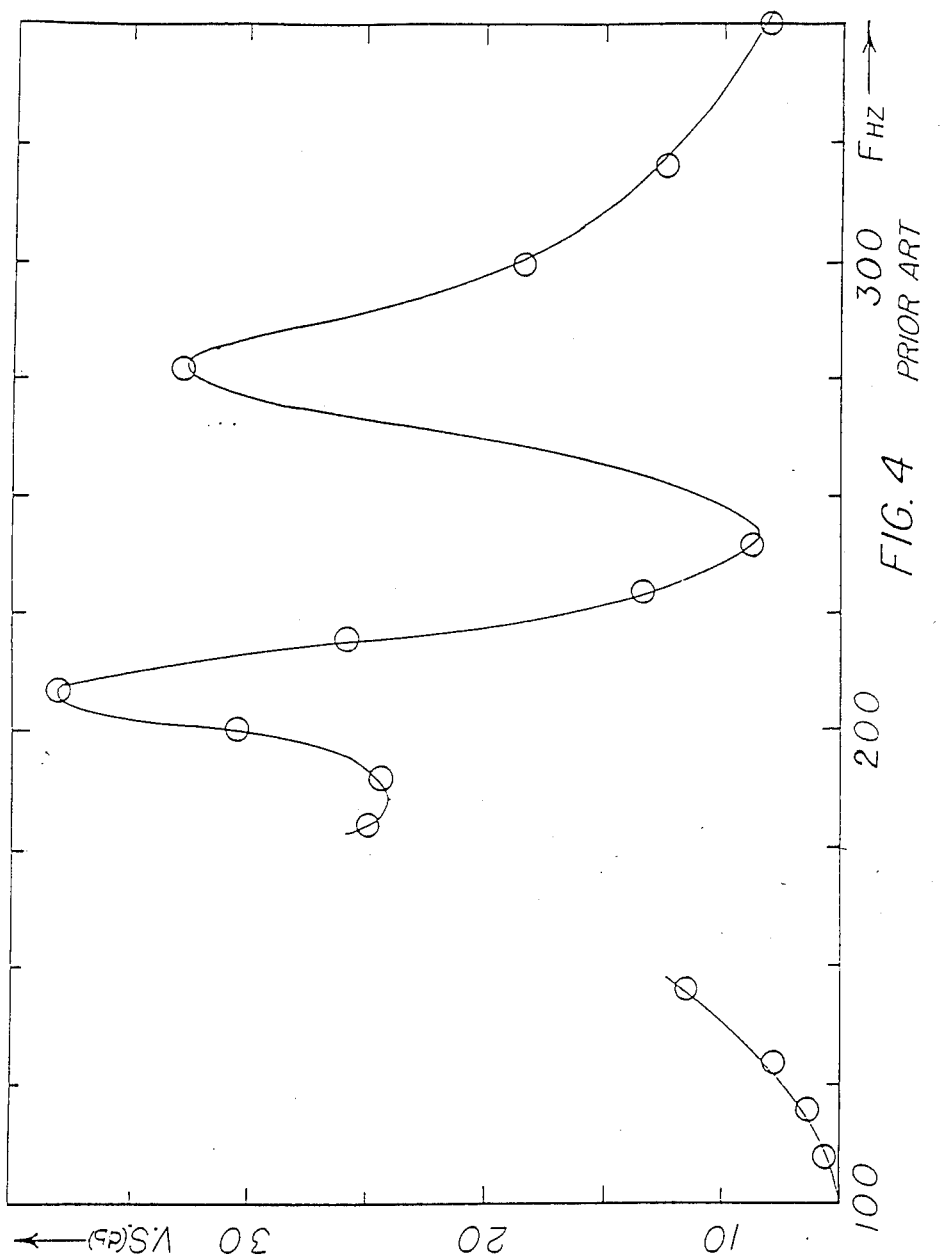
FIG. 4 is a graphical indication of the relative velocity of suppression as a function of frequency determined experimentally for the apparatus shown in FIG. 2, the external terminating capacitance at each frequency being given by FIG. 3.

It was shown in FIG. 4 that the vibration level could be reduced at a succession of frequencies by using the optimum external electrical termination for each frequency as predicted in FIG. 3.

The object of this invention is to do this automatically, i.e., to follow the "line frequency" as a function of time. It is also the object to do this not only for a very clean sinusoidal signal, but also for a signal embedded in random noise.

We start with a vibration suppressor having an unshifted parallel resonance frequency of the mean f of the quasiline, $f_o$. The frequency internal on either side of $f_o$ is divided into a number of intervals $\Delta f_i$, $-N$, $-N+1$, $\ldots -1, 1, \ldots N$, with $f_i$ at the center of the ith interval and where the quality factor $$2_i = f_i/\Delta f_i$$

ought to be at least as large as $Q(f_i)$ of the parallel-resonant system. If there is no random noise, the frequency can be counted easily. With band-limited random noise present, the frequency of the line is estimated by counting the axis crossings (from the positive to the negative direction) for a fixed interval of time. The statistical analysis of S. O. Rice can be used to give the accuracy of the estimate as a function of the line level, noise level, band width and duration of the count. If the count falls in the interval $\Delta f_i$, the ith of a set of fast-acting relays closes and $Z'_{ei}$ is inserted as the external electrical termination of the transducer.

B. The Transducer and Electrical Termination

Figure 1:
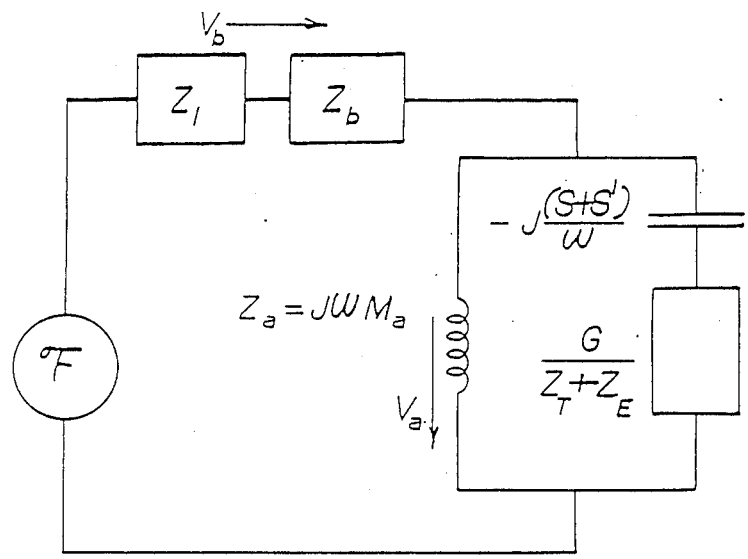
FIG. 1 is a circuit diagram showing the equivalent electrical circuit for a known electro-mechanical vibratory force suppressor.
Figure 2:
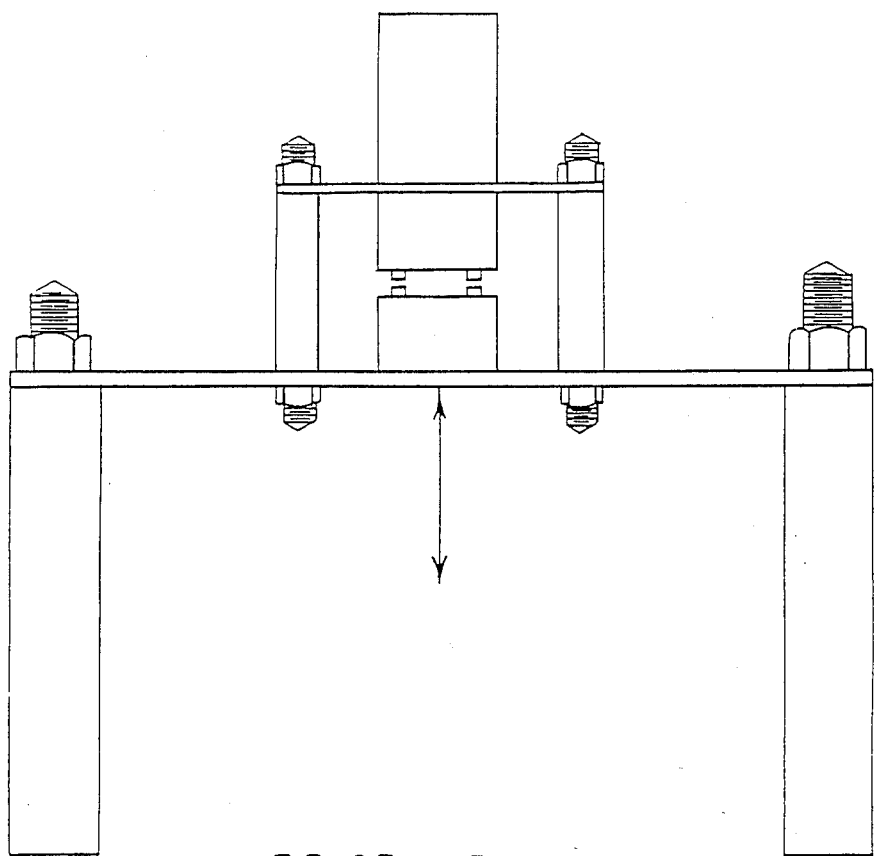
FIG. 2 is a plan view of a known vibration supressor mounted on a simulated foundation and subjected to a concentrated vibrational force.

The vibration suppressor used in this invention was somewhat similar to that shown in FIG. 2 of the patent. The mechanical part is essentially a spring-mass combination mounted for parallel resonance. For concreteness, the transducer is of the variable reluctance type. There are associated electrical circuits to provide the dc magnetic bias, and connections to the logic circuit and to the electrical terminations.

Figure 7:
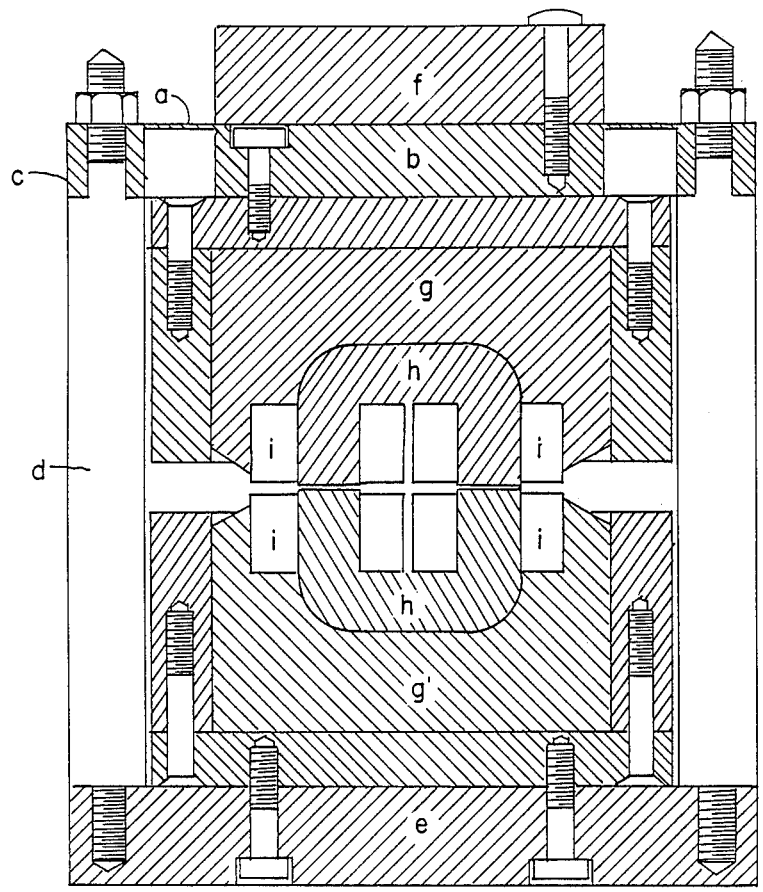
FIG. 7 is an elevational view, partly in section, of a mechanical parallel resonance and transducer combination embodying features of the present invention.

The spring used in the suppressor shown in the patent was a leaf spring. It was difficult to get the precise stiffness desired. It wasn't perfectly flat and thus introduced nonlinearities. It worked at the clamping points and thus reduced the mechanical Q. For this reason, the spring of the present invention was formed by cutting an annulus a into a flat, thick piece of high-alloy steel (FIG. 7). The annulus was integral with a central disc b and an outer mounting ring c. The outer ring was supported and held rigidly in place by six heavy studs d, the other ends of which were driven into the base plate e. An extra disk f was fastened to one side of the central disk b and one of the transducer core-cups g was fastened to the other side of the central disk b.

The heart of the transducer was a pair of magnetic cores h with coils i of wound copper with electromagnet-grade insulation. Each core was in the form of a "C". They were made of laminated, oriented-grain silicon steel. (It was desirable that the incremental permeability of the core be high in spite of the large dc magnetic bias and that the hysteresis and eddy current losses be minimized). Four coils, one on each leg, were made to fill as much of the core "window" as possible. The two coils on each core were connected in series. Each core with its coils was potted with an epoxy-type potting compound in a micarta cup. The cores were oriented in the cups in such a way that the pole faces of the two cores were in juxtaposition. One cup was fastened to the central disk and the other was fastened to the base plate. The cups were shimmed so that the gaps between the pole faces closed to the appropriate value after the dc bias current was applied. The external coil leads from each cup were connected in series (although parallel operation is also proper).

The dc bias current is provided by a battery j (FIG. 8), although an electronic high-impedance constant-current source can also be used. When the device is put into operation, it is imperative that the cores have no residual magnetization, i.e., be normalized. This is done by starting with a high dc current and simultaneously reducing and continually reversing the current. This is done with a rheostat k and an DPDT switch l. The dc current passes through a large swinging choke m; it prevents the dc source from shorting (in the ac sense) the transducer external connections. Because of its large inductance and the lesser blocked inductance $L_T$ of the transducer, there would be a very large voltage that would be generated when the current is interrupted. To prevent this, a pair (connected back-to-back) of high power Zener diodes n is used.

Once the cores are normalized, the dc current could be increased steadily from zero to the operating point. The selector switch o is then put on "Op" which connects the Logic and the transducer terminations p to the output leads of the transducer r.

Figure 9:
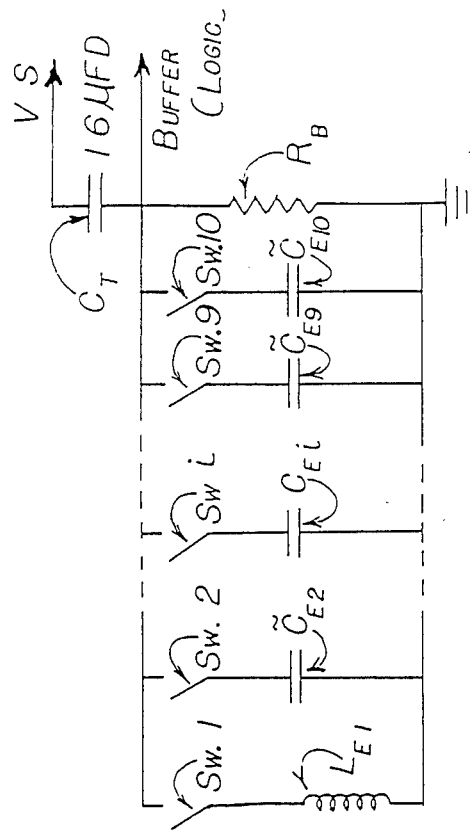
FIG. 9 is a circuit diagram of the transducer termination shown in FIG. 8.

FIG. 9 shows some details of the transducer terminations. The termination of the transducer is made up of 16 μfd capacitor $C_T$ in series with a particular capacitor, $\tilde{C}_{ei}$; i=2–10. If "i" changes, the position of the latter is momentarily left open. To insure that a signal to the logic circuit is always present, a large bleeder resistor $R_B$ shunts $\tilde{C}_{ei}$. (The signal is taken from across the bleeder resistor.) It also prevents a slug of current when the "new" $\tilde{C}_{ei}$ is cut in since it allows the 16 μfd capacitor $C_T$ to remain charged to very nearly the dc voltage across the V.S.

The values of $\tilde{C}_{ei}$ were determined experimentally at the central frequency of each interval under the same conditions to be met in operation, e.g., the shielded cables to the bank of relays and to the logic circuits were in place. Those values are listed in the last column of Table I. The values are those indicated on the cover of the capacitors; the exact value of capacitance was not determined accurately. The case of i=1 is special. $\tilde{C}_{el}$ is not a capacitance; it is an inductance $L_{el}$ of 0.035H. It is a swing choke to keep the inductance nearly independent of the level of the signal through it.

B. The Logic System

Figure 10:
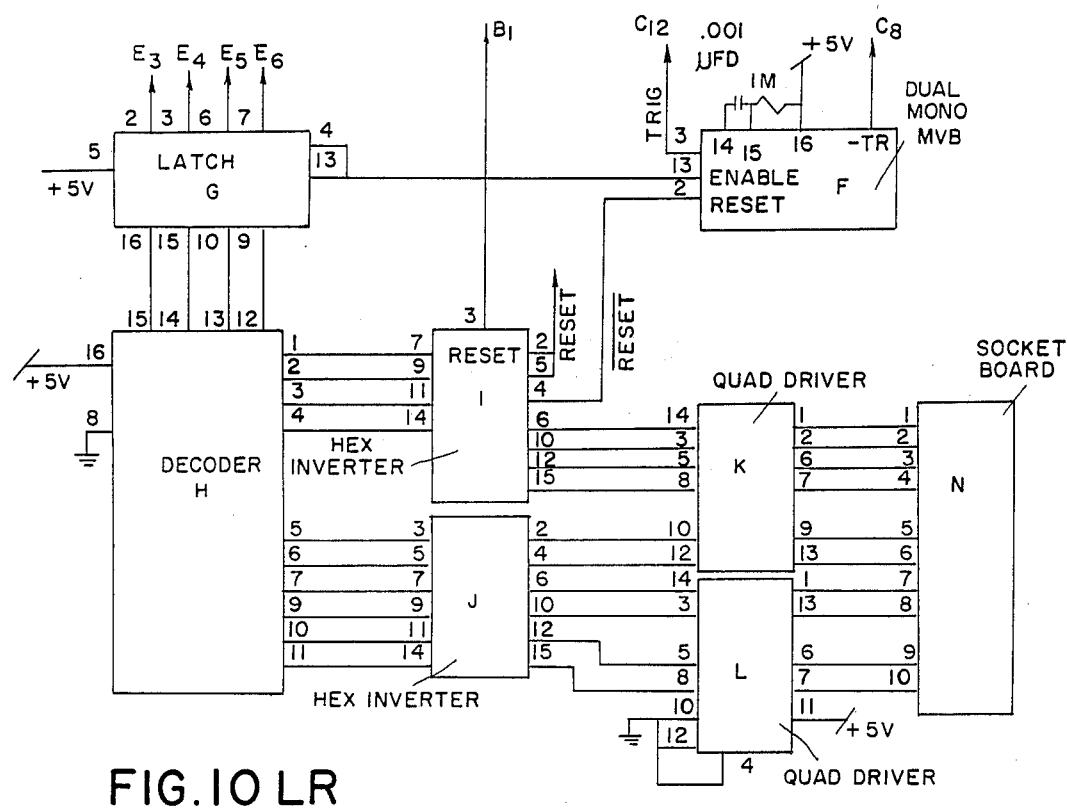
FIG. 10 is a circuit diagram of the digital logic netowrk shown in FIG. 8.

The process of treating a signal related to the noisy force in order to insert impedance into the external terminals of the transducer is performed with the digital logic system using I.C.'s, as shown in FIG. 10. The signal is generated in the transducer as a result of the relative motion of the two core halves and is coupled from the transducer terminals through a 16 μfd capacitor to the logic input. (The logic input is also shunted by the ith external impedance $Z'_{ei}$). This signal is conditioned in a buffer amplifier, oo, a precision Clipper O, a Schmitt inverter C, and a NOR gate D (to prevent hang-up of a signal coinciding with limits of counting interval) and then to the signal counter E. The logic circuits used to analyze this signal are controlled by a clock. The clock signal (here a 60 hz signal from a power line, although a crystal clock could be used) is clipped in a diode circuit, conditioned in Schottky inverter C and counted in a BCD Counter A. The output of the counter is subjected to logic operations in two four-level NAND Gates B.

The counter is free-running. The seventh binary output is used to determine the duration of the basic counting cycles: 128 times 1/60 sec. This output is inverted and sharpened in a Schmitt Trigger Inverter C. The leading edge of the output pulse triggers the signal Counter E. Logic operation are performed by two 4-input NAND Gates B. One gate output occurs 1 sec after initiation of the cycle and is used to determine the count period. After a double inversion in C, it is used to trigger a Dual Mono MVB F to get an "enabling" pulse for a Latch G. This same output of gates B, after inversion in inverter C is compared with the signal output from an inverter C, in the NOR Gate D (see above). Another output of gates B, which occurs at 112 time 1/60 sec after the start of the cycle, is used, after an inversion in HEX Inverter I, to reset the signal counter E and, after another inversion in HEX Inverter I, to prevent the MVB F from sending out an "Enable" pulse during the latter (recovery) part of the counting cycle.

Once it is triggered, the signal counter E is set to run free, i.e., once a count of 256 is reached, it starts over again. For a signal frequency f lying between 256 Hz and 296 Hz, the count after 1 sec will appear as f−256. If the count number is taken from pins 3, 4, 5 and 6, the binary reading will be (f−256)/4. Of course, only integers are indicated and thus there is an increase in the count of 1 for each increase in four Hz of the frequency. This is how the 4 Hz width of the interval is obtained. Table 1 shows the reading of the binary counter for frequencies lying in each of the ten intervals to be covered.

TABLE 1

| i | Counter reading | Band | Center Band | $C_{ei}$ |
|---|---|---|---|---|
| 1 | 0000 | 256–260 Hz | 258 Hz | 0.035 Henries |
| 2 | 0001 | 260–264 Hz | 262 Hz | 5 μfd |
| 3 | 0010 | 264–268 Hz | 266 hz | 3.224 μfd |
| 4 | 0011 | 268–272 Hz | 270 Hz | 2.32 μfd |
| 5 | 0100 | 272–276 Hz | 274 Hz | 1.948 μfd |
| 6 | 0101 | 276–280 Hz | 278 Hz | 1.616 μfd |
| 7 | 0110 | 280–284 Hz | 282 Hz | 1.494 μfd |
| 8 | .0111 | 284–288 Hz | 286 Hz | 1.371 μfd |
| 9 | 1000 | 288–292 Hz | 290 Hz | 1.318 μfd |
| 10 | 1001 | 292–296 Hz | 294 Hz | 1.224 μfd |

The output of the signal counter is continuously being fed to a LATCH G until E1 is reset which prepares it for the next cycle. This data is transferred to the Q output of the latch when it is "enabled" by a HIGH pulse from the MVB F. During the pulse ($\approx 800$ μsec.), Q follows the data input. When the Enable signal goes LOW, the information that was present at the data input at the transition time is retained at the Q output until the Enable is again permitted to go HIGH.

The Latch G provides four BCD inputs to a One-of-Ten Decoder H which provides ten mutually exclusive outputs. Each channel has an inverter I and J, which can excite a Driver K and L. The excited Driver draws current through the ith relay—a fast-acting, no-bounce wetted-mercury reed relay. This introduces $C_{ei}$ into the terminating current (See FIG. 9). An alternative to the relay is an Analog Switch.

Test

The purpose of the test was two-fold: (i) to demonstrate that the line-follower actually worked and (ii) to determine the magnitude of the impedance of the suppressor as a function of frequency. Clearly, if the second aim is met, the first is also.

Ultimately, the final test of the device would be in practice. There, a comparison of vibration velocity, with and without vibration suppression, would indicate the advantage of the vibration suppressor for that location. But, if combination of the internal mechanical impedance of the noisy machine and of the base were small in magnitude, even a suppressor impedance of modest magnitude might suppress the vibration strikingly. Alternatively, the vibration of a very high impedance installation might not be altered much even though the magnitude of the suppressor impedance was quite high. To get a definitive picture of the suppressor's capability, it is desirable to ascertain the magnitude of the impedance of the vibration suppressor as a function of frequency.

This is done by mounting the vibration suppressor on a ballistic disk. A vibrator, using the same type of cores and only a superficially different scheme of mounting, is also attached to the disk. All of the mass of the vibration suppressor and of the vibrator, except the spring-mass combination in each case, is added to the mass of the disk to determine the ballistic mass, M. The net impedance at the vibrator is $Z_{v.s.} + jwM$. From the fundamental definition of impedance.

$$|f_{v.s.}| = |Z_{v.s.} + jwM| |vel_{v.s.}|,$$

where $|f_{v.s.}|$ is the magnitude of the force applied by the driver. The parameters of the driver are monitored and the velocity (as measured by an accelerometer mounted on the disk) magnitude $|vel_{vs}|$ is noted as a function of frequency. Then the dc current to the suppressor is removed, the cores pried apart and a sheet of smooth plastic forced between them. The bias current was again applied so that the cores clamped the plastic very tightly. The mass m of the spring-mass combination is thus added to M making a new ballistic mass $M' = M + m$, and the spring was fixed. This was also driven with a $|f_{M'}|$ at many frequencies, the parameters of the driver were monitored, and the velocity magnitude $|vel_{M'}|$ was noted $$|f_{M'}| = |jwM'| |vel_{M'}|.$$

If the parameters of the driver are identical for the two cases at a given frequency, $$|Z_{v.s.} + jwM| |vel_{v.s.}| = wM' |vel_{M'}|,$$

or $$|z_{v.s.} + jwM| = \frac{wM'|vel_{M'}|}{|vel_{v.s.}|}$$

At parallel resonance, $Z_{v.s.}$ is purely resistive and much larger than wM. Hence, $$|Z_{v.s.} + jwM| \doteq r_{v.s.}$$

at parallel resonance.

Figure 11:
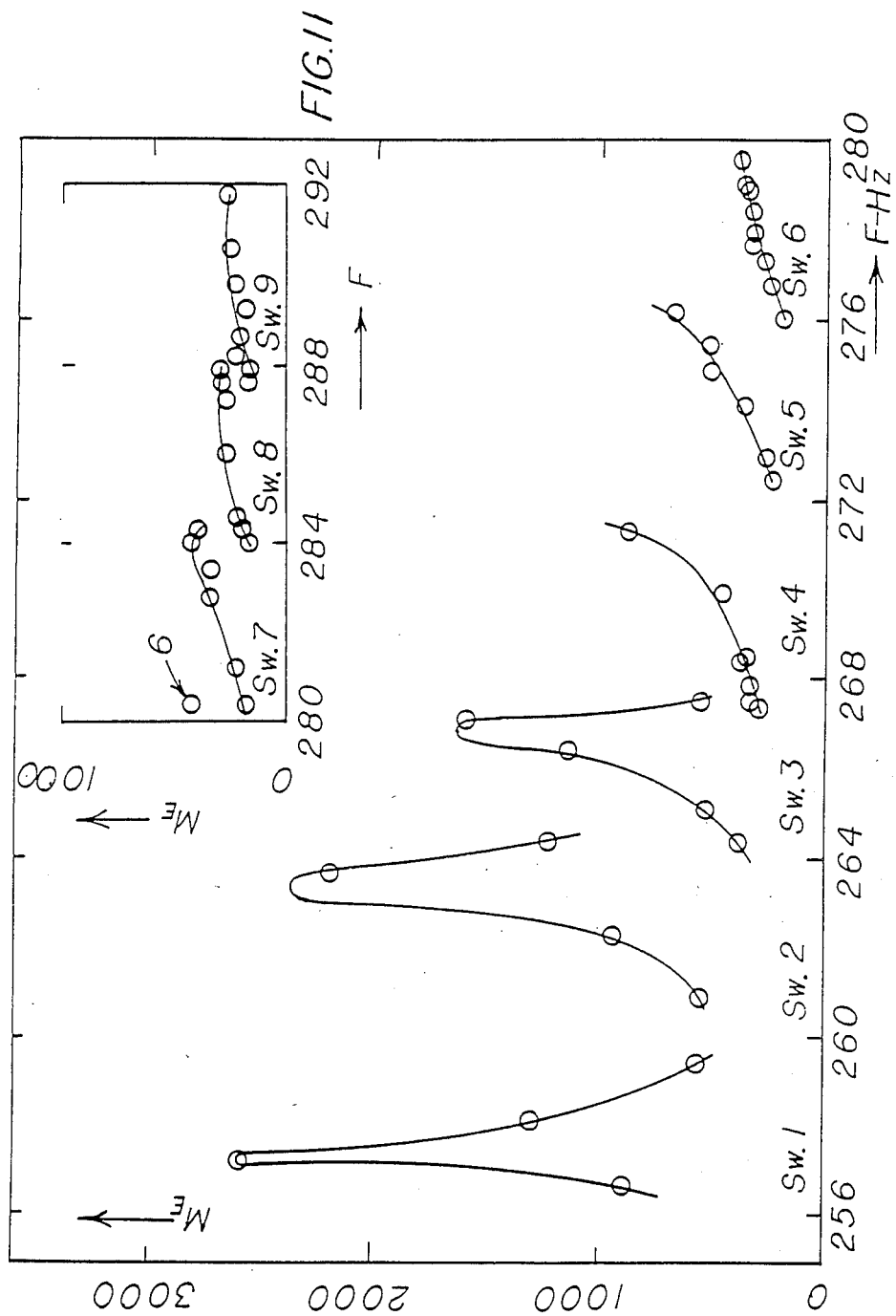
FIG. 11 is a graphical illustration of results obtained with the apparatus shown in FIGS. 8-10.
Figure 12:
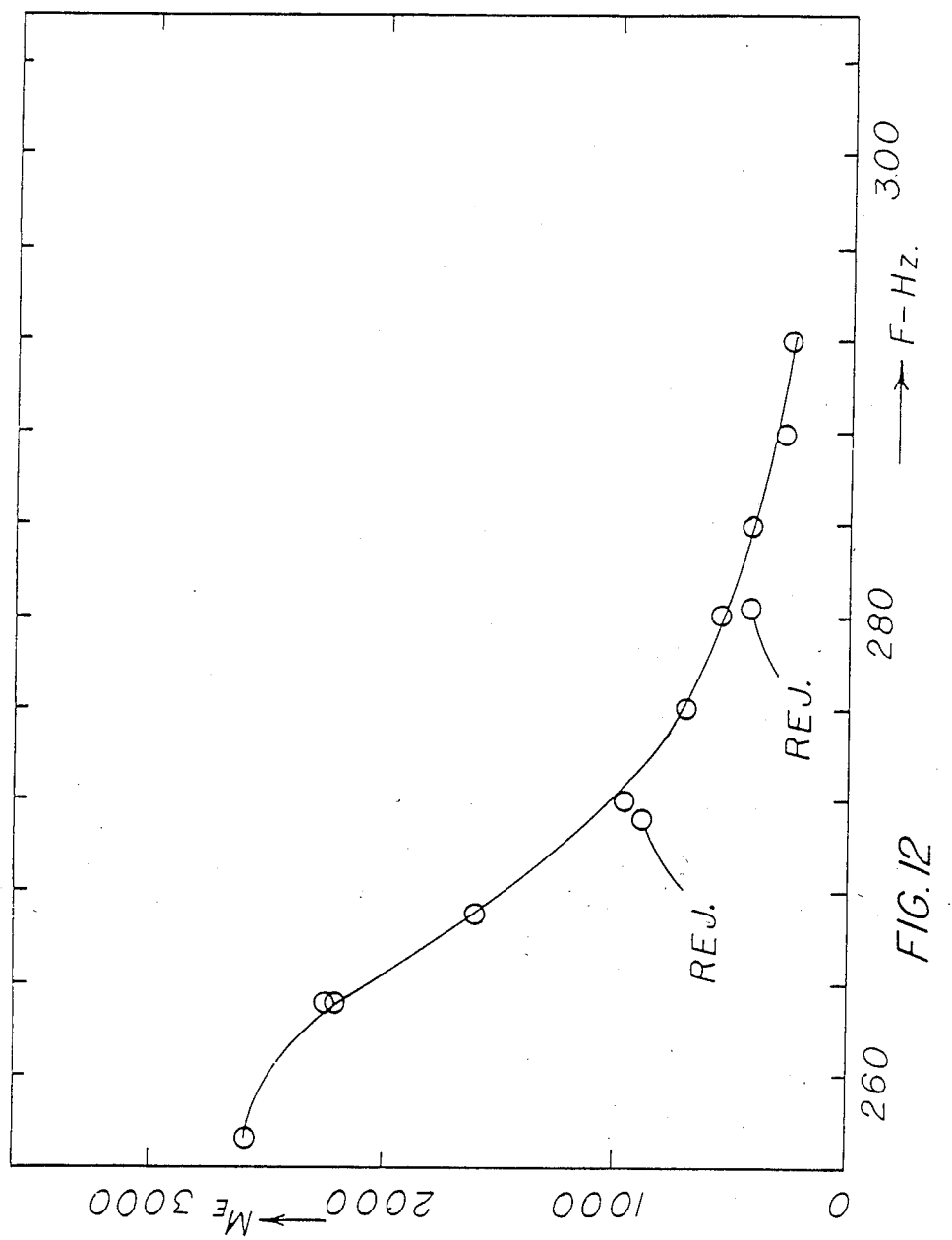
FIG. 12 is a graphic illustration of an equivalent mass curve obtained by drawing a smooth curve through the peaks shown in FIG. 11.

The result of one such dual experiment is given in FIG. 11. Here, $|Z_{v.s.}|$ is given in terms of an effective mass, although it should be noted that $Z_{v.s.}$ is never a pure mass and, in fact, is purely resistive at a parallel resonance frequency. During the experiment, the relay that was closed at each frequency was determined; this is indicated in this figure. It can be seen that a peak of the effective mass occurs with each interval. The fact that the effective mass drops off sharply in the interval is due to a pessimistic estimate of the expected Q. The Q defined by the mid-frequency divided by this interval was approximately one-fourth the actual Q for the first few intervals at least. As the parallel resonance frequency is displaced more and more, the peak becomes smaller and broader (lower Q). This results from the increase in electro-magnetic losses with the amount of displacement of the parallel resonant frequency. If narrower frequency intervals were used, the equivalent mass curve would approach that given in FIG. 12 which is made by drawing a smooth curve through the peaks of the previous curve.

D. An Alternative Logic System

Since the quasisinusoidal vibration has an "instantaneous frequency" that is varying slowly, the count of the pulses in the clipped and shaped signal is approximately equal to the frequency at the center of the counting interval multiplied by the length of the counting interval. In the above system, this estimate is retained to the end of the next counting cycle. Thus, it is stale by an amount that ranges from approximately $\frac{1}{2}$ of the counting interval to that plus the duration of the counting cycle.

The staleness can be reduced to $\frac{1}{2}$ of the effective counting time by obtaining a running average. This can be done by counting the pulses of the clipped signal in a succession of subintervals, each of duration $\tau$, and summing over N successive most recent subintervals. Thus, if the subintervals are numbered 1, 2, 3, ... i, ..., the estimated frequency $f_i$ for $t = i \times \tau$ is given by $$f_i = \frac{1}{N\tau} \sum_{j=i-N/2}^{j=i+N/2} n_j,$$

where $n_j$ is the number of pulses counted in the jth subinterval. Note that i is in the middle of the range of j's which are summed, and that $f_i$ is not available until this particular sum is finished, i.e., $N/2\tau$ later than the middle of this set which occurs at $t = i\tau$. To find $f_{(i+1)}$, another count, from the subinterval $j = i+1+N/2$, is added and the count from the subinterval $(j = i - N/2)$ is subtracted, i.e. now j runs from $(j = i+1 - N/2)$ to $(j = i+1+N/2)$, giving again N subintervals.

This procedure can be realized by clock controlled digital electronics circuits such as shown in FIG. 10(UR)'. The clock (CK) is the source of precise square waves whose period is $\tau$. The frequency of oscillation is estimated by counting a square wave (such as is fed to pin 14 of E in FIG. 10) alternately in counters $CT_a$ and $CT_b$ for subperiods of $\tau$. This is done by dividing the clock signal by two and using the positive pulse of the output O to enable counter a, $(CT_a)$, and the positive pulse of output $\overline{O}$ to enable counter b, $(CT_b)$; thus the counters count alternately. They are cleared by their corresponding OR circuits ($OR_a$ and $OR_b$) when they are not counting. The output O is also used to synchronize the rest of the logic (except 3-S Ba, which is synchronized by $\overline{O}$). The counters are synchronous 4-bit counters to get precise counts of $n_j \approx f_i\tau$ (which here is assumed not to exceed 15, else the bit capacity would have to be increased). A counter has to be cleared before it can count again, and in the meantime, it retains its logic signal. To prevent interference, each counter is gated by a Quad 3-state buffer (3-s $B_{a'b}$); the gate is open during the counting subinterval and here is done by an active Low Enable (note the inverted connection). The 4-bit outputs are fed to the same Synchronous 4-bit Shift Register (SR-1), the first of a sequence of (N+1), each of which transfers its data synchronously when the enable E is applied. (If N is large, it may be necessary to drive a number of buffers with E, each of which would "clock" a few registers.) The output of the first register is a count n that is the latest count during a subinterval of $\tau$; it is sent to an arithmetic unit that will add (and accumulate) successive logic signal from S.R.-1 synchronously. It will also subtract the logic signal from S.R.-(N+1). This unit will start from zero initially, and will accumulate N logic signals for the first frequency estimate. At end of $t = (N+1)\tau$, and thereafter, the logic signal from S.R.-(N+1) will be subtracted synchronously as the logic signal from SR-1 is added.

E. Binary Selection of $C_e$

In the above Sec. C a discrete capacitor (or combination in parallel) $\tilde{C}_{ei}$ is required for each frequency subinterval, The capacitance is determined experimentally to be such that the vibration is suppressed opimally at the center of the "ith" band.

A simpler scheme is to provide n capacitors* whose capacitances are given by $Cj = C_{e1}2^j$, j = 0, 1, ..., (n−1). Thus there is a sequence of capacitors, starting with $C_{ei}$, having each capacitance twice as large as the previous one, and ending with $C_{e1}a^{n-1}$.

*The tilde is removed in sequel.

For each frequency subinterval i there is a binary number, $g_i$, in the output of the Latch G (see FIG. 10). Instead of converting this into a 1 in 10 decoder in order to select the discrete capacitor $C_{ei}$ as before, here it provides an address to a PROM (Programmable Read Only Memory) (see FIG. 10 (LL)' and (LR)') which is directed to the part of the memory matrix in which a binary numder $d_{ij}$ (i same as i in $g_i$) has been programmed. It has been chosen such that the net parallel capacitance $$C_{ei} = C_{e1} \sum_{j=0}^{n-1} d_{ij}2^j$$

is determined experimentally so that the vibration suppression at the center of the "ith" frequency subinterval is optimum. This matrix multiplication is performed as follows: When the enabled signal is applied, the binary number stored at the "ith" address appears in the outputs. The digit in the "jth" position closes the "jth" switch by actuating its solenoid if the digit is one, or leaves it open if the digit is zero. The "jth" switch is in series with $C_j$, and these switch-capacitor combinations are connected in parallel (see FIG. 9) and then across the V.S. transducer external terminals.

From Table I, it is readily seen that for the range of frequencies covered that the capacitance is greater than, say, 1.2 μfd. There would be some advantage in putting $C_{eo}$=1.2 μfd. as a fixed part of the $C_{ei}$'s, and adding the rest by means of the PROM controlled binary scheme.

If the V.S. units are not exact duplicates, or if an installed unit is severely bumped, the matrix elements $d_{ig}$ would have to be changed but not the capacitors. Then the PROM would have to be replaced by an E PROM or even a RAM.

II. Earless Dynamic Absorbers or Vibration Suppressions

The impedance of a spring-mass system in parallel resonance is purely resistive. As the frequency increases, the resistance drops (rapidly if the Q is high) and a stiffness reactance develops, reaches an extreme, and then (more slowly) diminishes in magnitude. As the frequency decreases below the parallel resonance frequency, the resistance also drops rapidly and a mass reactance develops, reaches a maximum, and then (more slowly) diminishes. If either reactance is equal and opposite to the sum of the internal reactance of the machine and the reactance of the foundation ($Z_i+Z_b$), the net reactance is zero and there is a spurious mechanical series resonance. The resulting vibratory velocity may exceed the vibratory velocity of the machine and of the foundation without the suppressor, as shown in FIG. 5, where the plot of velocity without suppression sticks up above the velocity with suppression on both sides of the tuned frequency. The loops are sometimes called "ears", although they may not be symmetrical or may not both be present.

An object of this invention is to prevent the spurious resonances, or to moderate the velocity there. The standard practice is to use what was once called a Framm filter, i.e., to add sufficient damping to the dynamic absorber so that the damped spring-mass combination had enough resistance to make the mechanical Q of the spurious series resonance low and to reduce the size of the "ears" significantly. Unfortunately, this reduced the performance at the parallel resonance frequency.

The object is to introduce damping that is effective at the frequency of the spurious resonances, and is (almost) absent at the antiresonant frequency $F_a$. There are two classes of means for doing this: (a) to use a series tuned circuit in the external impedance that is shunted by a passive network, or (b) one shunted by an impedance created by a negative feedback amplifier.

Figure 13A:
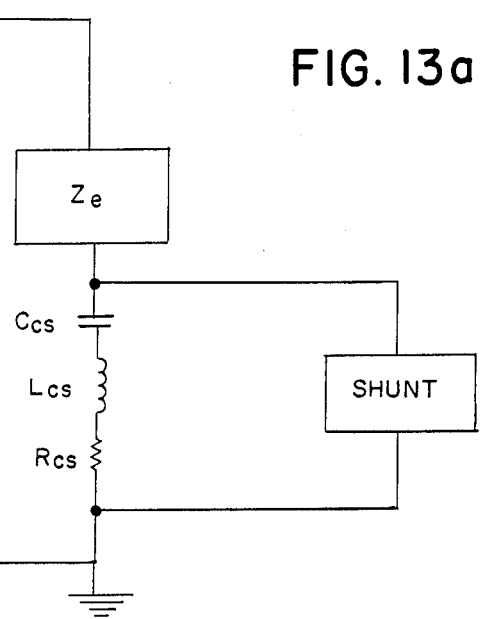
FIG. 13a is a general circuit for providing a means of creating $Z_{ear}$ and of inserting it and $Z_e$ across the output of the V.S. Uses only lumped electrical parameters.
Figure 13A:
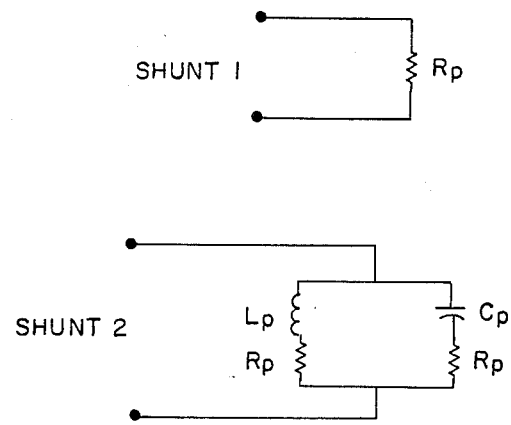

Let the transducer of the vibration suppressor be terminated in the $Z_{ei}$ required for the V.S. to be antiresonant at a specified frequency $f_i$, in series with an impedance $Z_{ear}$. (See FIG. 13a.) $Z_{ear}$ is formed of a parallel combination of a series resonant circuit, $$Z_s = R_s + jwL_s - \frac{j}{wC_s} \qquad \text{II-1}$$

shunted by an impedance $Z_p$. At $f=f_i$, the series impedance is a relatively low resistance $$Z_{si}=R_{si}=w_iL_s/Q_i$$

where $Q_i$ is the (high) Q of that arm. At $f=f_c$ the shunting impedance is not critical, but frequencies removed from $f_i$, the shunting should be such that $Z_{ear}$ have an appreciable resistive component.

Thus the total electrical impedance of the electrical part of the transducer $$Z_t=Z_e+Z_{ear}+Z_{bl}$$

where $Z_{bl}$ is the blocked impedance of the transducer, when transformed by the transducer to a virtual mechanical impedance $$Z_v = \frac{G}{z_e + z_{ear} + Z_{bl}}$$

which acts in one of the arms of the V.S. antiresonant circuit and should add an appreciable resistive component to it, and thus strongly damping the V.S. The total resultant impedance to the vibration of the base is thus given by $$z_t = z_b + \frac{(jw \cdot m_a x)\left[r - j\left(\frac{s + s'}{w \cdot x}\right) + z_v\right]}{v + jw_0 m_a \left(x - \frac{1}{x}\right) + zv} \qquad \text{II-3}$$

To illustrate quantitatively the various means for providing damping at a spurious frequency, the vibration suppressor having the set of parameters cited in the example of Section I are used, and the transducer is taken to be mounted on a "foundation" consisting of a freely suspended mass of 50 pounds. Then

TABLE II $(z_i + z_b) = j36.55 \times 10^6 \times x \frac{gm}{sec}$ $z_a = jx7.31 \times 10^6 \frac{gm}{sec}$ $\frac{-j(s + s')}{w} = -j \frac{5.881 \times 10^6}{x} \frac{gm}{sec}$ $r^* = 2.8 \times 10^4 \frac{gm}{sec}$ $Z_t = jw \cdot 554 \text{ hen} = j891x \frac{hen}{sec}$ $G = 1.271 \times 10^9 \text{ henries} \frac{gm}{sec^2}$ $W_o = 2\pi 256 \text{ hz } x = f/256 \text{ hz.}$ $Q_0 = 260$

*($r$ is a lumped mechanical resistance placed in the right branch of the antiresonance circuit which will give it a Q of 260 @$W_o$.)

The system of the V.S. plus the 50# foundation mass has a series resonance at X=1.0954 for the case of $Z_{ear}$=0. The net mechanical reactance is $1.009 \times 10^b$ gm/sec. which is ≈1/35 that of the 59# foundation alone.

Figure 13B:
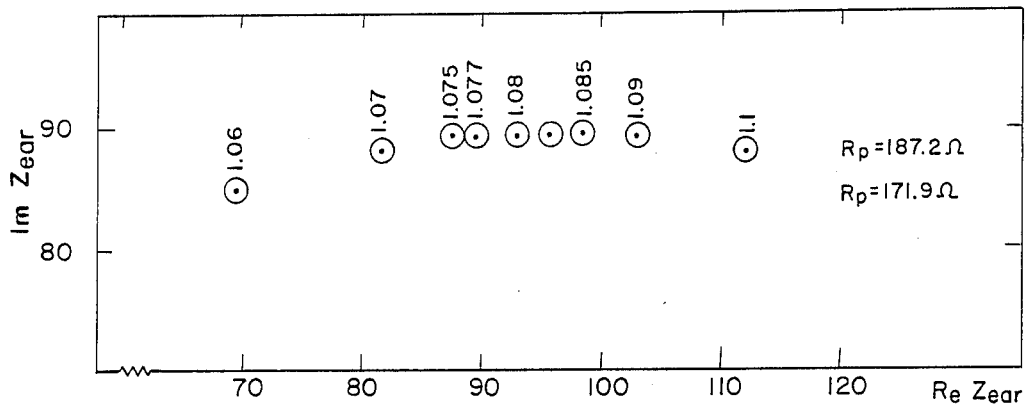
FIG. 13b shows $R_e Z_{ear}$ vs. X for case of resistive shunt.

A. Passive Shunting Elements (1) Simple Resistive Shunt. The simplest way to provide the shunting is to use a shunting resistance, $R_p$, as shown in FIG. 13b. Thus $Z_{ear}$ is $Z_{si}$ in parallel with Rp, and it becomes $$Z_{ear} = \frac{R_p \left[ R_s + jwL_s - \frac{j}{wc_s} \right]}{R_p + R_s + jwL_s - \frac{j}{wc_s}} \qquad \text{II-4}$$

This is substituted successively in Equation 2 and Equation 3 to give $Z_t$.

At the frequency of the series resonance (the spurious $f_e$) of $Z_t$, where the "ear" is maximum, the imaginary part of $Z_t$ is zero, i.e.

$$Jm(Z_t) = 0 @ x_e, \qquad \text{II-5}$$

and the net mechanical impedance of the system is $$Z_t/x_e = ReZ_t/x_e, \qquad \text{II-6}$$

and the optimum value of Rp is that for which $$\frac{\partial [R_e z_t]}{\partial R_p} / x_e = 0 \qquad \text{II-7}$$

Equations 5 and 7 are nonlinear implicit equations of the variables $L_s$, $R_s$, Rp, and $X_{ear}$. ($C_s$ and $L_s$ are resonant at $f_i$). The inductor in the series is chosen with $L_s$ and with Q as large as practical. Then the two equations can be solved simultaneously for Rp and $X_{ear}$.

With $L_s = 0.75$ henries, $R_s = 8$ ohms and the other parameters as specified above, $$R_p = 4.97 \times 10^6, \; x_e = 1.0865,$$

for which $$Z_t = 4.97 \times 10^6 + j0.72 \times 10^6.$$

Figure 13C:
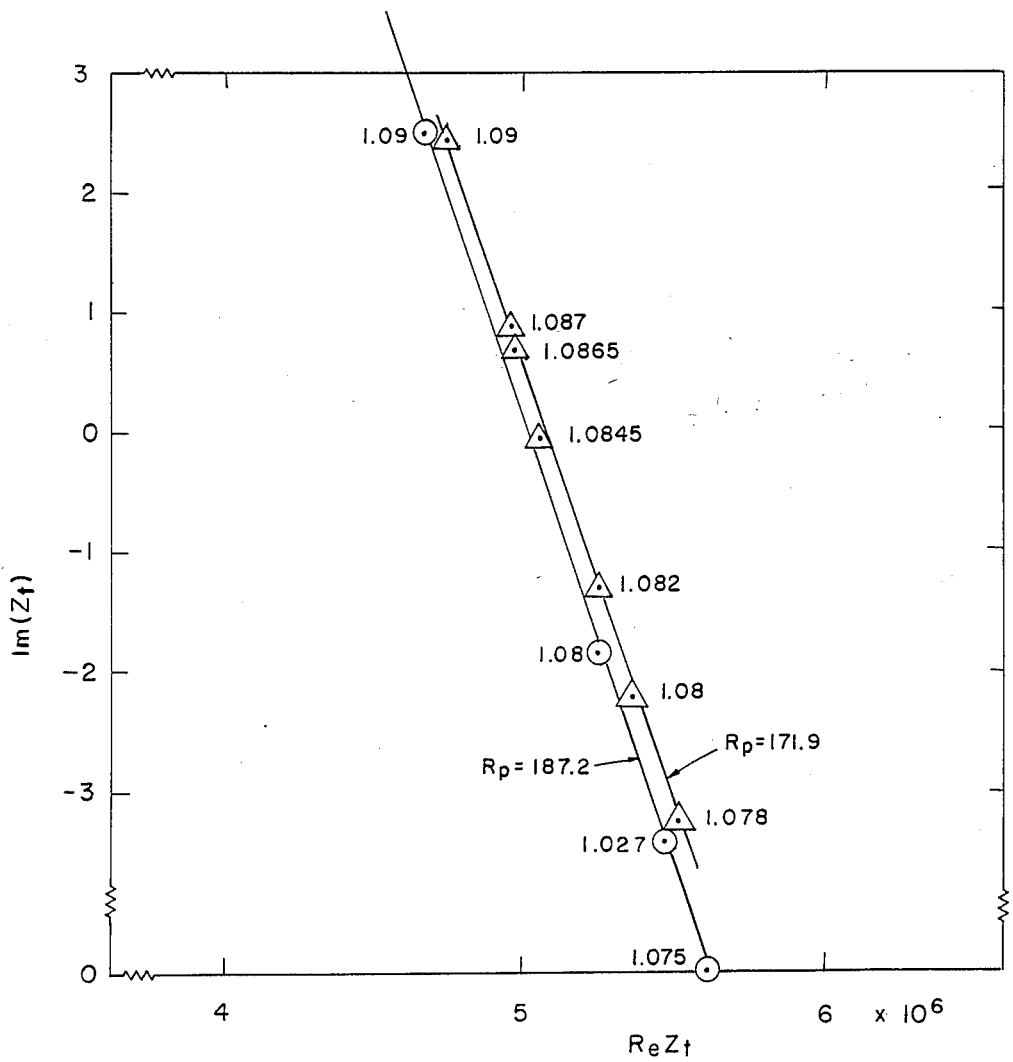
FIG. 13c shows $R_e Z_t$ vs. X for case resistive shunt.

The Equation 4 was used to calculate $Z_{ear}$ for a range of X's about this value; the results are given by the lower curve in FIG. 13b. Then Equation 3 was used to calculate $Z_t$ for a range of X's and the results are plotted as the righthand curve in FIG. 13c. This shows that, for Rp = 171,955 ohms, a more accurate value of Xe = 1.0845 at which $Z_t = 5.06 \times 10^6$.

Another set of curves was obtained with Rp changed to 187.2 ohms. $Z_{ear}$ is plotted in FIG. 13b, upper curve, and $Z_t$ is plotted in FIG. 13c, lefthand curve. Thus Rp = 171.935 ohms gives a somewhat larger $Z_t$ at $X_e$.

In both cases, $Z_e$ was taken as zero to simplify the calculations. The V.S. antiresonant f can be shifted to a new one, $f_i$, by using the appropriate $Z_e$; this would change the parameter required for $Z_{ear}$.

These results can be compared with the undamped series resonance case for which the parameters are:

$$R_p = 0, \; X_e = 1.0950.$$

The total impedance in this case is $$Z_t = 1.0093 \times 10^6 | Z_{ear} = 0$$

Thus, the vibration level, for the same exciting force, is reduced by 14 dB.

In both cases, $Z_e$ was taken as zero to simplify the calculation. If the antiresonant frequency is to be shifted to another frequency $f_i \neq F_0$, the appropriate value of $Z_e$ would be used; this would require changing the parameters that fix $Z_{ear}$.

(B1) Multiple Tuned Shunt. The same schematic of FIG. 13a, and Equation 1 for $Z_s$ is used in case 2 as was used in case 1. Shunt 2, shown in FIG. 13b, is a parallel circuit having an inductance Lp in series with a resistance Rp in one arm, and having a capacitance Cp in series with a resistance Rp in the other. (In each case, Rp includes the effective resistance of Lp or of Cp.)

The parallel circuit is tuned to the same frequency as the series circuit; $f_i$, and thus does not shunt it very much even if its Q = Qp is not very high.

$Z_{ear}$ here is given by $$\frac{1}{Z_{ear}} = \left[ \frac{1}{R_p(1 + Q_s^2 y^2)} + \frac{Q_p y + \frac{1}{Q_p x}}{R_p \left( Q_p^2 + \frac{1}{x^2} \right)} \right] + \qquad \text{II-8}$$

$$j \left[ \frac{-Q_p y}{R_s(1 + Q_s^2 y^2)} + \frac{Q_p z + \frac{1}{Q_p x}}{R_p \left( Q_p^2 + \frac{1}{x^2} \right)} \right]$$

where $y = X - 1/X$. There are four parameters here that can be selected: $R_s$, $Q_s$, Rp and Qp. A qualitative argument can be used to show that $Q_s$ should be large and $R_s$ should be small. The nondimensional frequency X can be set to a value $X_e$ which makes the imaginary part of $Z_{ear}$ (and hence the imaginary part of Equation 8) zero. It can be shown that Qp should be as large as practical. Then the imaginary part of Equation 8 can be used to determine Rp. Computations were made for an example in which many of the parameters were given by Table a and in addition:

$$Q_s = 100, \; R_s = 4, \; Q_e = 0$$

Figure 14A:
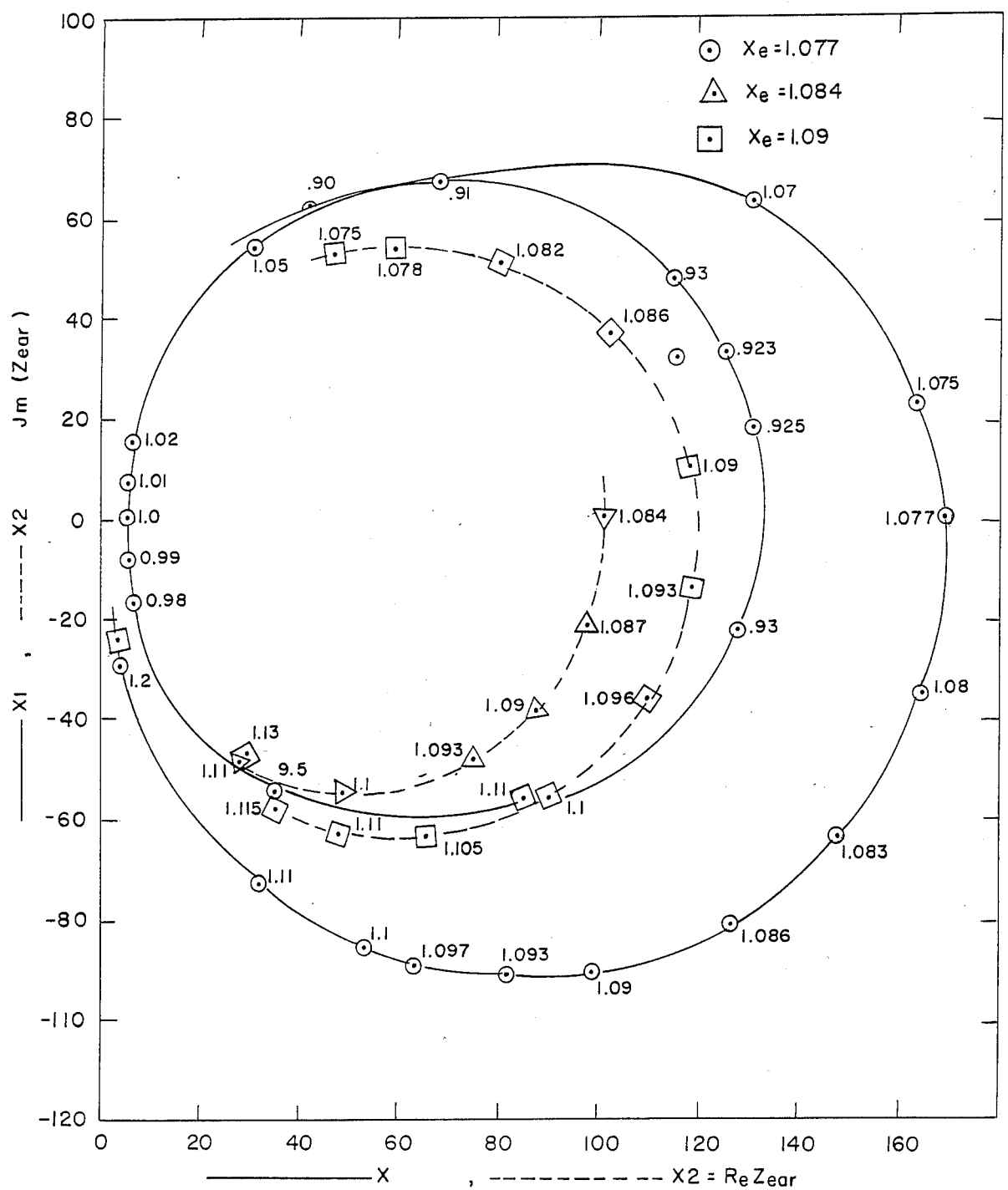
FIG. 14a shows $Z_{ear}$ vs. X for the case of the multiple tuned shunt.
Figure 14B:
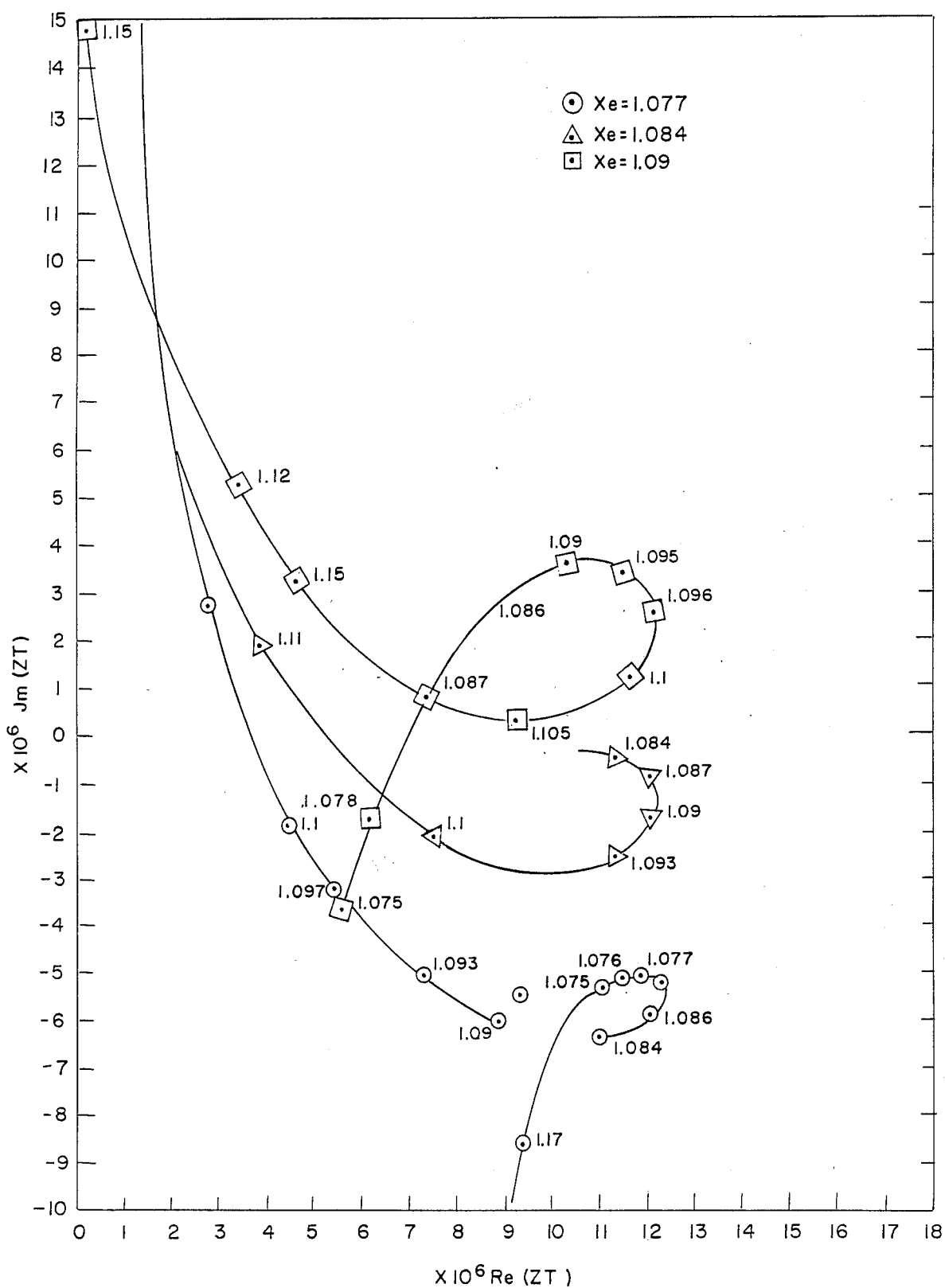
FIG. 14b shows $Z_t$ vs. X for the case of the multiple tuned shunt.

The curves for $Z_{ear}$ with $X_e = 1.077$, 1.084 and 1.09 are given in FIGS. 14a for which Rp = 0.449, 0.5295, and 0.620 respectively. Note in the case $X_e = 1.077$, that $Z_{ear}$ is very small at x = 1 and is real and very large at x = 1.077 and x = 0.924 which are at or near the "ear" frequencies. In the other two cases, the calculations weren't carried that far because with base chosen a lumped mass, there is only one ear. These values of $Z_{ear}$ were used in Equation 3 to get $Z_t$ in the three cases; they are plotted in FIG. 14b. For the Ko = 1.09 case, the minimum magnitude of $Z_t = 6 \times 10^6$ lbs/sec, while the other two cases have ranges in X for which the impedance is not as high, they all exceed the magnitude for the undamped case by over X 3.5 times.

B. Electronic Feedback Circuit Shunting Element.

The impedance of a spring-mass spring in parallel resonance is purely resistive. As the frequency increases, the resistance drops (rapidly if the Q is high) and a stiffness reactance develops, reaches an extremum, and then (more slowly) diminishes in magnitude. As the frequency decreases below the parallel resonance frequency, the resistance also drops rapidly and a mass reactance develops, reaches a maximum, and then (more slowly) diminishes. If this reactance is equal and opposite to the sum of the internal reactance of the foundation ($Z_i + Z_b$), the net reactance is zero and there is a spurious mechanical series resonance. The resulting vibratory velocity may exceed the vibratory velocity of the machine and of the foundation without the suppressor, as shown in FIG. 5, where the plot of velocity without suppression sticks up above the velocity with suppression on both sides of the tuned frequency. The loops are sometimes called "ears", although they may not be symmetrical or may not both be present.

An object of this invention is to prevent the spurious resonances, or to moderate the velocity there. The standard practice is to add sufficient damping to the dynamic absorber so that the damped spring-mass combination has enough resistance that the mechanical Q of the spurious series resistance is low and the size of the "ears" is significantly reduced. Unfortunately, this reduces the performance at the parallel resonance frequency.

Consider an electrical impedance shunting $Z_{ei}$ in such a way that the shunting action is insignificant at the ith parallel resonant frequency $f_{oi}$, but for frequencies sufficiently different from $f_{oi}$, the shunting effect on $Z_{ei}$ would be quite noticeable and quite resistive. In the latter case, $Z_v$ would become fairly resistive and the parallel circuit of the vibration suppressor would likewise be quite resistive. Any spurious series resonance (probably at a slightly different frequency) would then have a low Q.

Consider a vibration suppressor used as a dynamic absorber. (Below, a more general case will be given.) If the terminating electrical impedance is zero, the device behaves simply like a machanical parallel resonance circuit. A series capacitor $C_{ET}$—inductor $L_{ET}$ combination terminates the transducer with a zero impedance if the combination is series resonant at $f_o$. The impedance is small for frequencies near $f_o$, especially if the inductance is small. The inductor should be a "swinging choke" or else have a powdered iron core in order that the inductance be relatively independent of the excitation. Now consider an impedance $Z_{os}$ shunting the inductor $L_{ET}$. The shunting effect of $Z_{os}$ should be insignificant at $f_o$, but, for frequencies sufficiently different from $f_o$, the shunting effect should be quite noticeable and quite resistive. In the latter case, the virtual mechanical impedance resulting from the action of the transducer would likewise be quite resistive. In turn, the impedance of the parallel-resonance combination will also be quite resistive. At some $f_s$ not too different from $f_o$, the reactive part of this combination might be equal and opposite to the reactance of the base plus the machine resulting in a series resonance. The vibration velocity then is high unless the resistive part of the combination is significant.

Figure 15A:
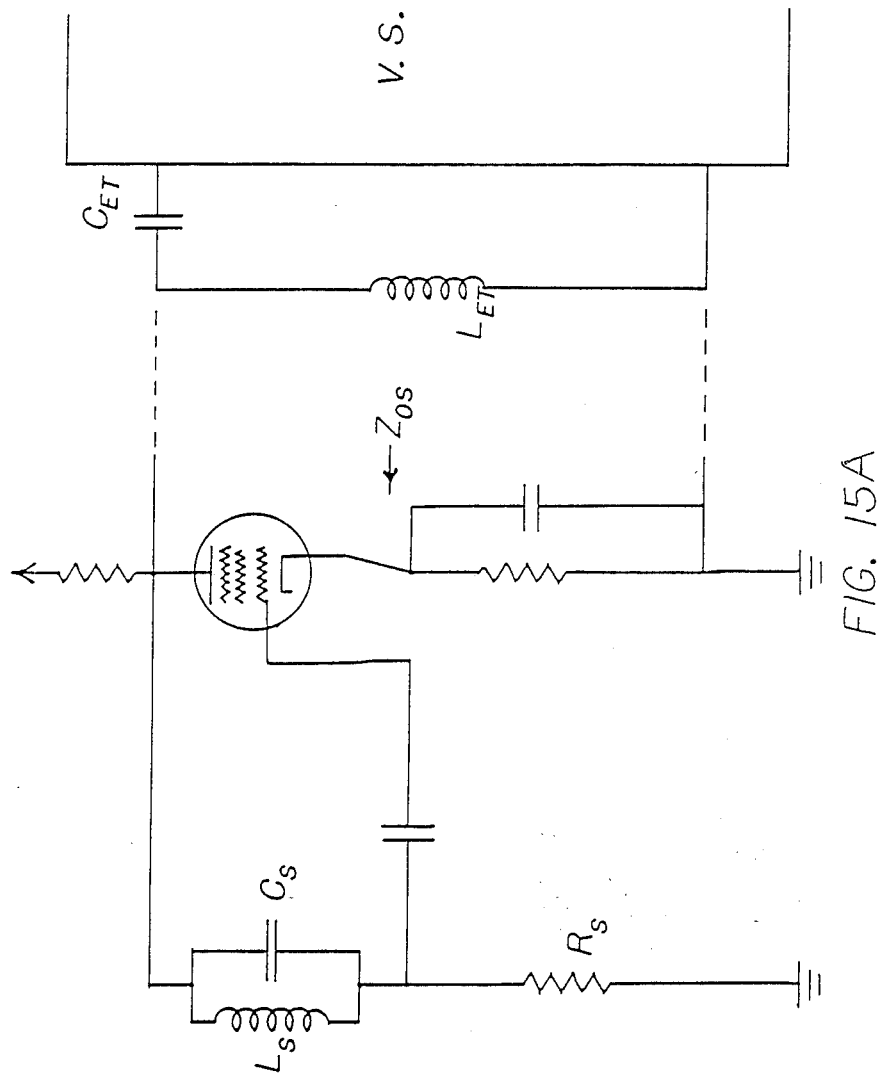
FIG. 15a is a circuit diagram of a transducer termination network including a variable shunt.
Figure 15B:
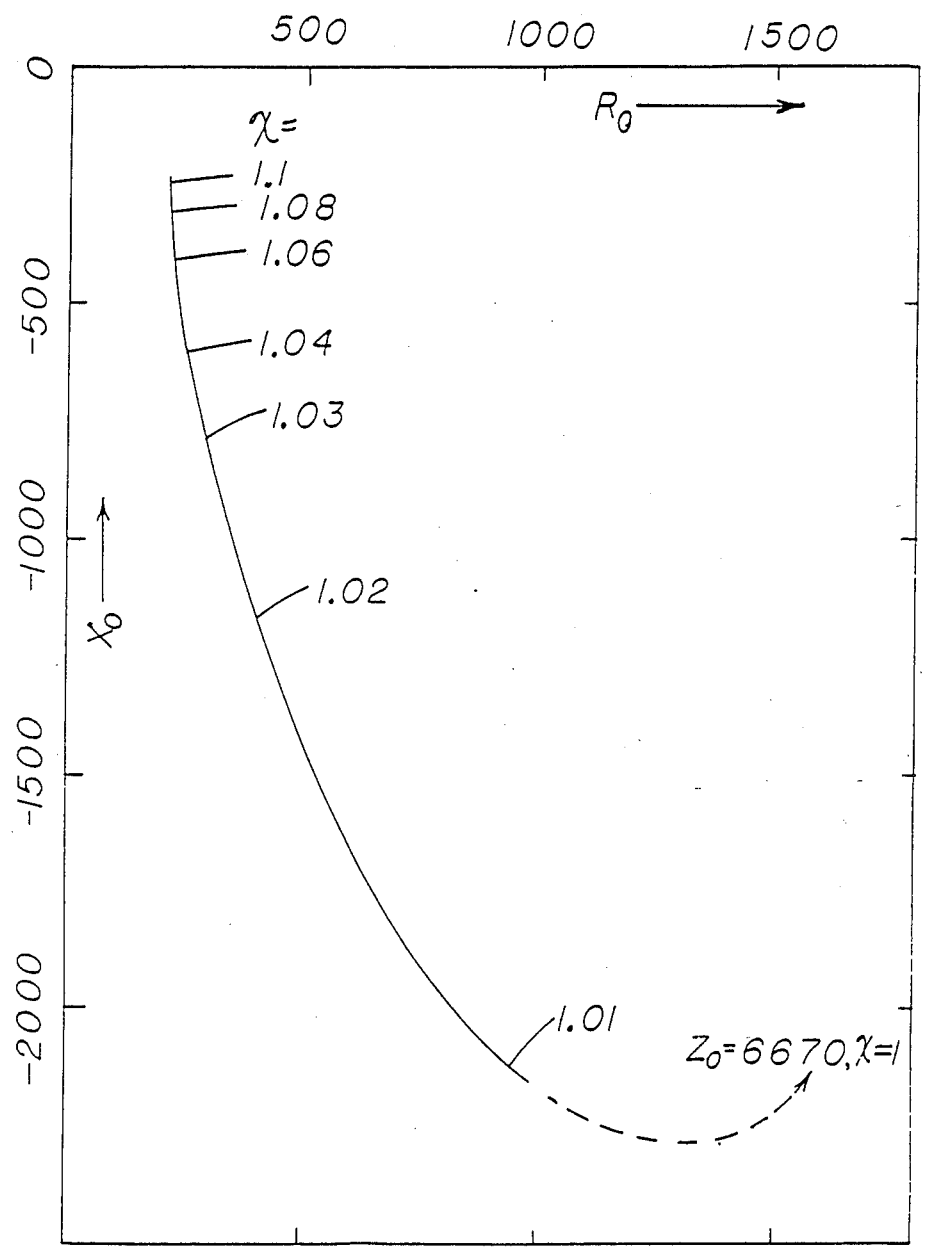
Figure 15C:
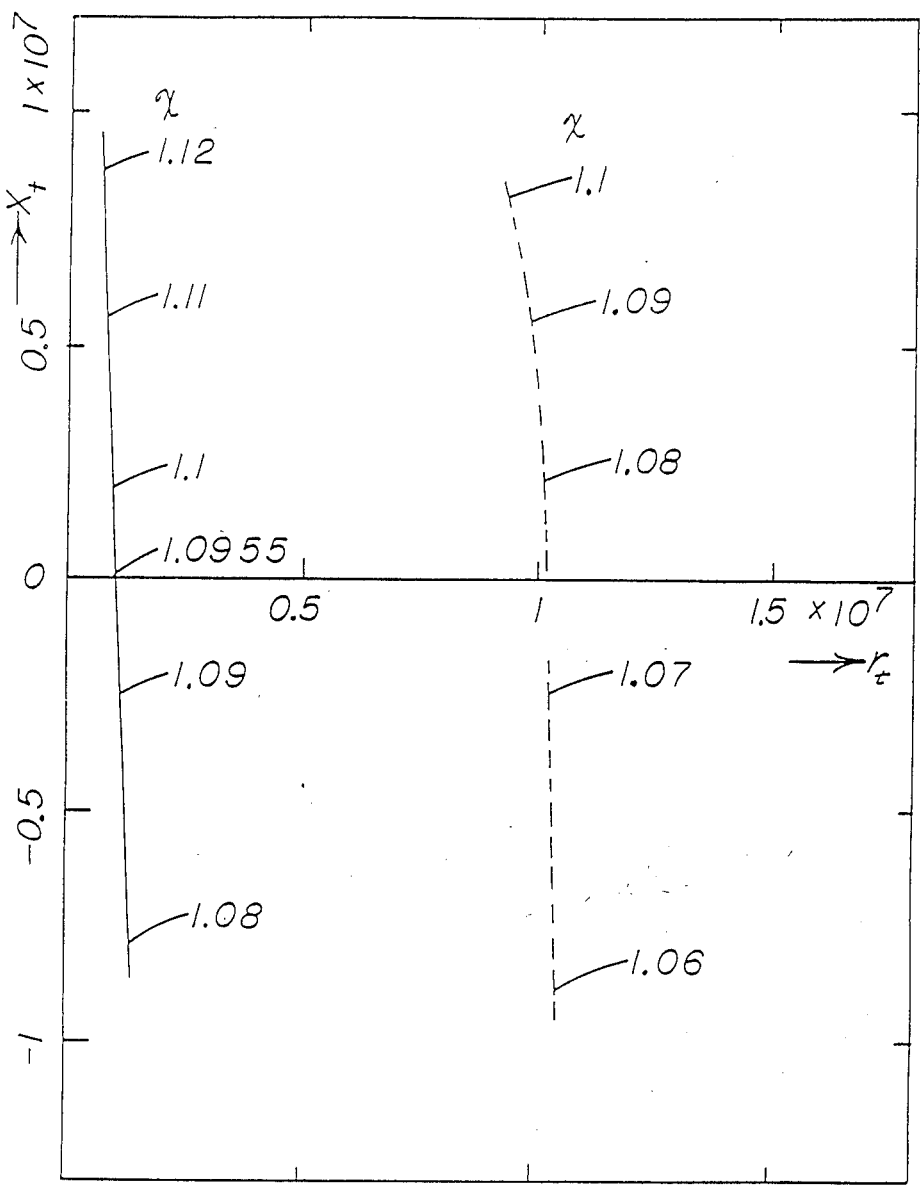
FIG. 15c is a graphical comparison of the total mechanical impedance of the vibration suppressor with the transducer terminated as in FIG. 15a (- - -) vs. that for the transducer with an a.c. shunt (—).

One way of providing the different degrees of shunting by $Z_{os}$ is by tailoring the output impedance of an amplifier by introducing an appropriate filter in the negative feedback circuit. The output impedance $Z_{os}$ is given by $$Z_{os} = \frac{1}{\frac{1}{r_p} + Tgm}$$

where rp is the plate resistance, gm is the mutual transconductance and T is the transmission of the filter to the grid in the negative feedback circuit. In the specific example, (FIG. 15a), the feedback filter is a parallel combination of an inductor $L_s$ and a capacitor $C_s$ in series with a resistor $R_s$. Provided that the parallel resonance frequency is also $f_o$, $R_s$ is comparable to $w_oL_s$, and $w_oL_s/r_s$ is large, where $w_oL_s/r_s$ is the Q of the inductor. Then $$T = \frac{R_s}{R_s + \cfrac{r_s + jr_sX\left[-QX^2 + Q - \frac{1}{Q}\right]}{X^2\left[\frac{1}{Q^2} + \left(X - \frac{1}{X}\right)^2\right]}}$$

where $X = f/f_o$, a non-dimensional frequency. For $Q=140$, $R=38,000\Omega$, $r=64.7\Omega$, $gm=5\times10^{-3}$ mhos and where the 1/rp term can be ignored, $Z_{os}$ is given by FIG. 15b. Computations have been made of the efficacy of this shunting of $L_{ET}$ for transducer parameters similar to those obtained in the test of Section I. The zero impedance termination at $f_o=256$ hz is obtained with a capacitor, $C_{ET}$ of 2.76 Mfd in series with an inductor $L_{ET}$ of 0.14 henries. The mass m is taken as 10 lbs. and (s+s′)is $9.46\times10^9$ c.g.s. units. The electromechanical coupling constant G is taken $1.271\times10^9$ c.g.s. units, the blocked inductance is taken 0.554 henries. The foundation is taken as a mass M of 50 lbs. The Q of the (s,m) combination is taken as 260. With the transducer bias cut off, the total mechanical impedance $Z_t$ of M with the parallel resonance combination of s and m (acting as a high-Q dynamic absorber) is given by the solid curve of FIG. 15C. With the transducer activated and terminated with $C_{ET}$ in series with $L_{ET}$ and with $L_{ET}$ shunted by $z_{os}$, the total mechanical impedance $Z_t$ is given by the dashed curve in the figure. For both curves, the parametric values X along the curves are indicated. Note that, in the former case, $|Z_t|$ is a minimum at $f_s \approx 1.0955$, so that, with a constant exciting force, the vibration velocity of M is increased at the series resonance by a factor of 40; in the later case, $f_s \approx 1.077$ and the vibration velocity of M is increased by a factor of only 3.86. Thus, the vibration velocity at the spurious resonance is reduced by a factor of 10.4. In the latter case, the shunting effect of $Z_{os}$ is not completely neglible at $f_o$; the magnitude of the impedance generated is 30% less than it would have been had there been no shunting effect. The vibration velocity is increased even somewhat more because of the added attenuation provided by the electromagnetic losses in the transducer at $X\neq 1$.

If the shunting impedance is $Z_e(f_{oi})$, $f_{oi}\neq f_o$, the $Z_e$ is large enough so that $Z_{os}$ can shunt it in the manner above. Here, $Z_{os}$ should not provide noticeable shunting at the new antiresonant frequency $f_{oi}$, and strongly resistive shunting above and below that frequency.

III. A Broadband Termination for the Vibration Suppressor

Figure 6:
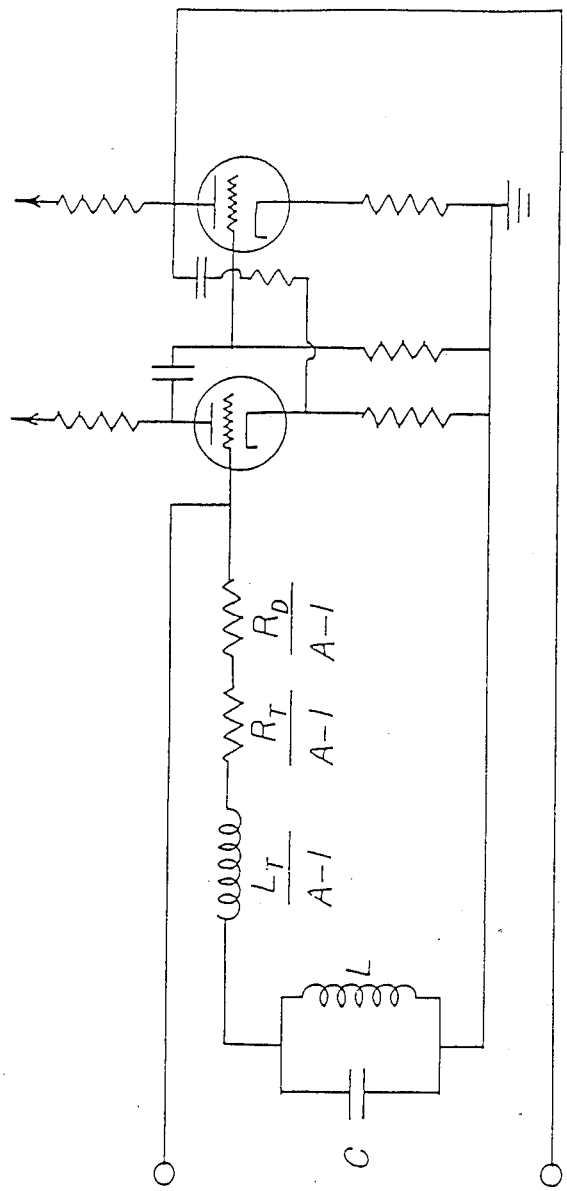
FIG. 6 is a circuit diagram of a series-type positive-feedback circuit for obtaining broad-band electrical termination.

FIG. 6 gives a means of providing the optimum electrical termination for a vibration suppression effective over a broad band of frequencies. It was shown experimentally (see Sec. I) and theoretically that the electromagnetic loss increases with $|f-f_o|$. This limits the width of frequency band over which the optimum termination is effective. An object of this invention is to provide an electrical termination over the effective bandwidth of the V.S. Its advantage is that it is simple and more stable.

Using the Analysis contained in the above mentioned patent, one can show that the exact formula for $Z_e$ can be replaced by an approximate one:

$$Z_e = j\alpha(1 - X), |X - 1| << 1, X = w/w_o,$$

where $$\alpha = w_o L_T\left(\frac{-2s}{s'}\right), X = w/w_o.$$

Figure 16:
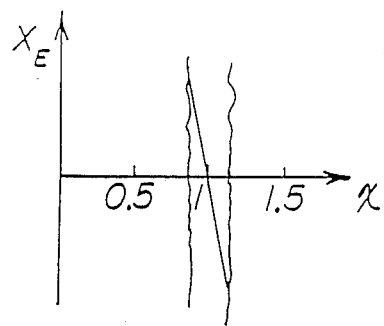
FIG. 16 shows a graphical approximation for a termination impedance.

That is shown in FIG. 16.

Figure 17:
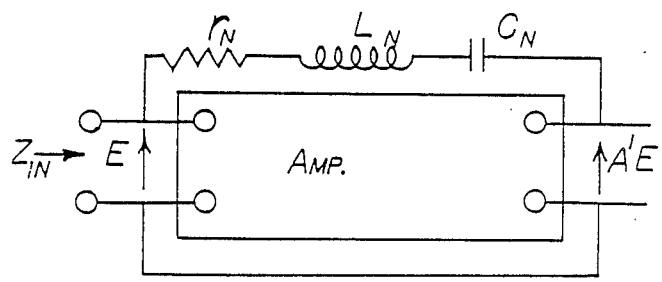
FIG. 17 shows a megative impedance circuit used in the present invention.
Figure 18:
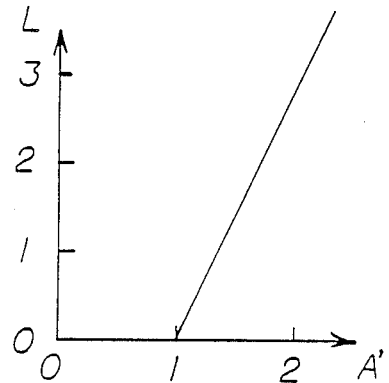
FIG. 18 is a graphical representation of a parameter of the circuit shown in FIG. 17.

Consider the negative inductance or negative capacitance circuit shown in FIG. 17. If A' is the complex gain and $w_o L_N = 1/w_o C_N$, then the input impedance $Z_{in}$ is given by $$Z_{in} = \frac{-r_N}{A' - 1} + j\frac{2w_o L_N(1 - X)}{A' - 1}.$$

IV. A Composite L.F. V.S. and Feedback

In the V.S. described in Sec. I, a means is provided to reduce vibrations at a surface by creating a high mechanical impedance at the point of attachment to a base, automatically, at the principal frequency of the "noise" force F. Its operation does not depend on a feedback signal (the signal picked up is strictly for estimating the instantaneous frequency) and is free from the danger of instability. The device provides a force at the point of installation that is (nearly) equal and opposite to F. The difference in the forces causes the residual vibration of the base, $v_A$. One way to reduce this residual vibration further is to insert a negative resistance as part of $Z_e$ and may already be very small (see Sec. C); this would manifest itself by increasing the impedance of the combined antiresonant circuit. This negative resistance must not be too large.

It can be argued that the electronically generated termination is not a feedback device, if no negative resistance is generated. With negative resistance, there is energy fed to the transducer at the terminating. This represents a kind of feedback, although not the usual type. This suggested the use of a more conventional feedback scheme, yet retaining the adjustable antiresonant part of the V.S., thus providing a composite means of controlling mechanical vibration.

Figure 19:
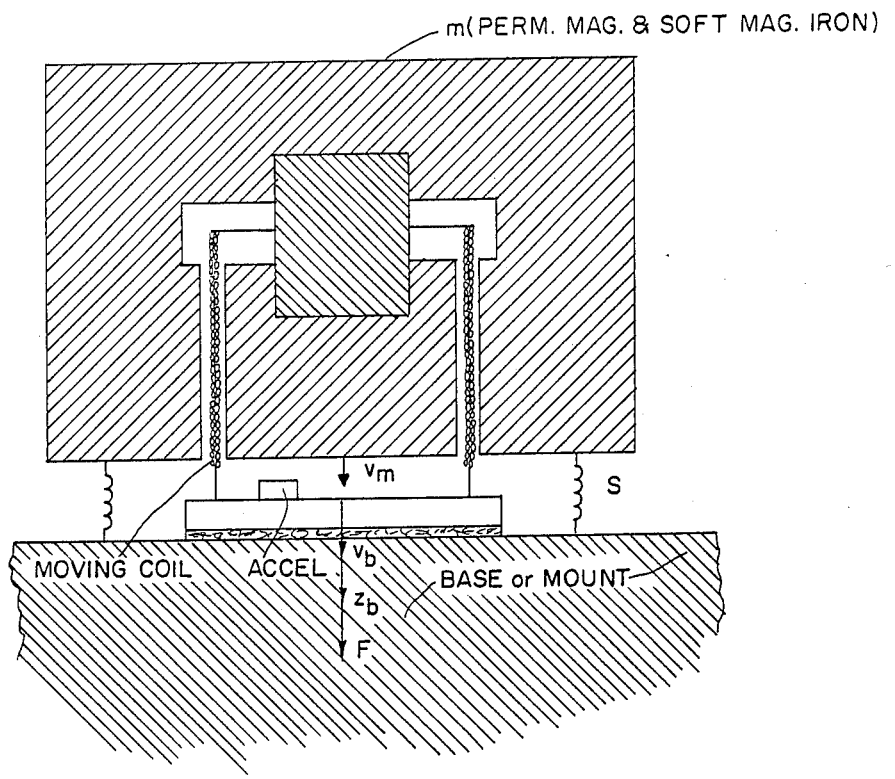
FIG. 19 shows a dynamic transducer for composite V.S. and feedback device.

A. Elementary Composite. A typical arrangement of a transducer used for a feedback velocity control device is shown in FIG. 19. It is a dynamic force transducer whose massive magnetic structure, mass m, is mounted on the base by means of springs (stiffness s). The moving coil is mounted directly on the base. An accelerometer is mounted nearby on the base.

Figure 20:
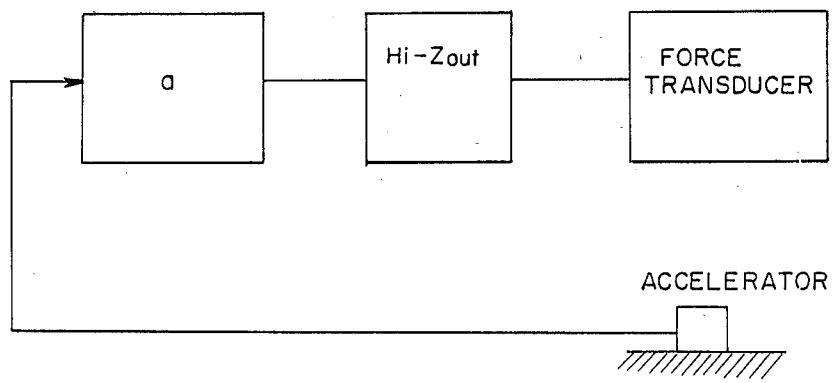
FIG. 20 is a block diagram for the feedback part of the composite velocity control device.

Undesirable vibration, velocity $v_b$, is caused by a "noise" force F, which is limited here (but see below) to a simple harmonic case. It is balanced by forces acting on the base by means of the springs s, the base's own impedance $Z_b$, and the feedback force, $F_b$. This is given by $$F_f = G_f j w v_b \times AC \times g_{fs}$$
$$= G_t v_b$$

where $G_f$ is the force-to-current constant of the transducer, A is the gain of the preamplifier, C is the calibration coefficient of the accelerometer, and $g_{fs}$ is the electronic transconductance of the last stage (see FIG. 20). (The use of $g_{fs}$ implies that the output impedance of the last stage is very high. Thus there is very little effect on the current due to the motion of the transducer per se). The motion of the system can easily be analyzed to give an expression for the velocity of the base, $$v_b = \frac{F}{z_b - [-f(X)]},$$

where $$-f(X) = -\frac{w_o m\left(1 + j\frac{X}{Q_o}\right) - jXG_{to}}{j\left(X - \frac{1}{X}\right) + \frac{1}{Q_o}}$$

$$= X^{(X)} + iY^{(X)},$$

and is the effective impedance produced by the composite device, acting on the base. Here, the mechanical resistance of the mass/spring combination at $f_o$ determines the $Q_o$. X is the nondimensionalized frequency obtained by dividing the frequency f by $f_o$, and $G_{to} = G_t$ at $f_o$.

The value of $Z_b$ is limited in the real world to have a positive (or zero) real part. If a plot of $[-f(X)]$ on the complex plane, with X, as the running parameter, (see FIG. 21), encloses the point $Z_b$, the system is unstable. A vector from the origin to a point on the plot defined for a given X can be subtracted from the vector for $Z_b$ to give the vector for the total impedance on which F must act to produce the base velocity, $v_b$. Thus $|Z|$ is a direct measure of the efficacy of the vibration control system.

Figure 21:
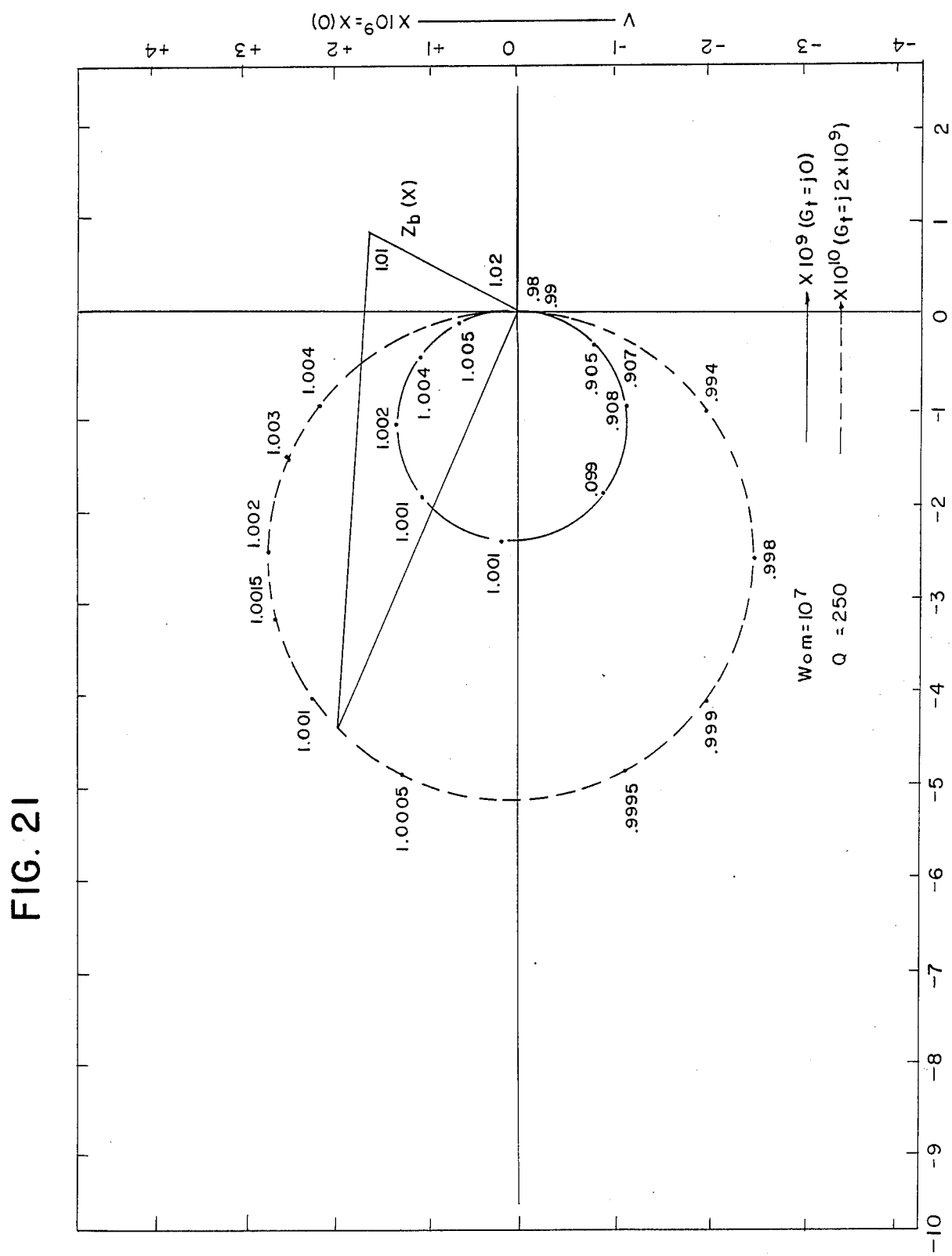
FIG. 21 shows mechanical impedance for velocity control using composite of vibration suppression and negative feedback to the vibration suppressor.
Figure 23:
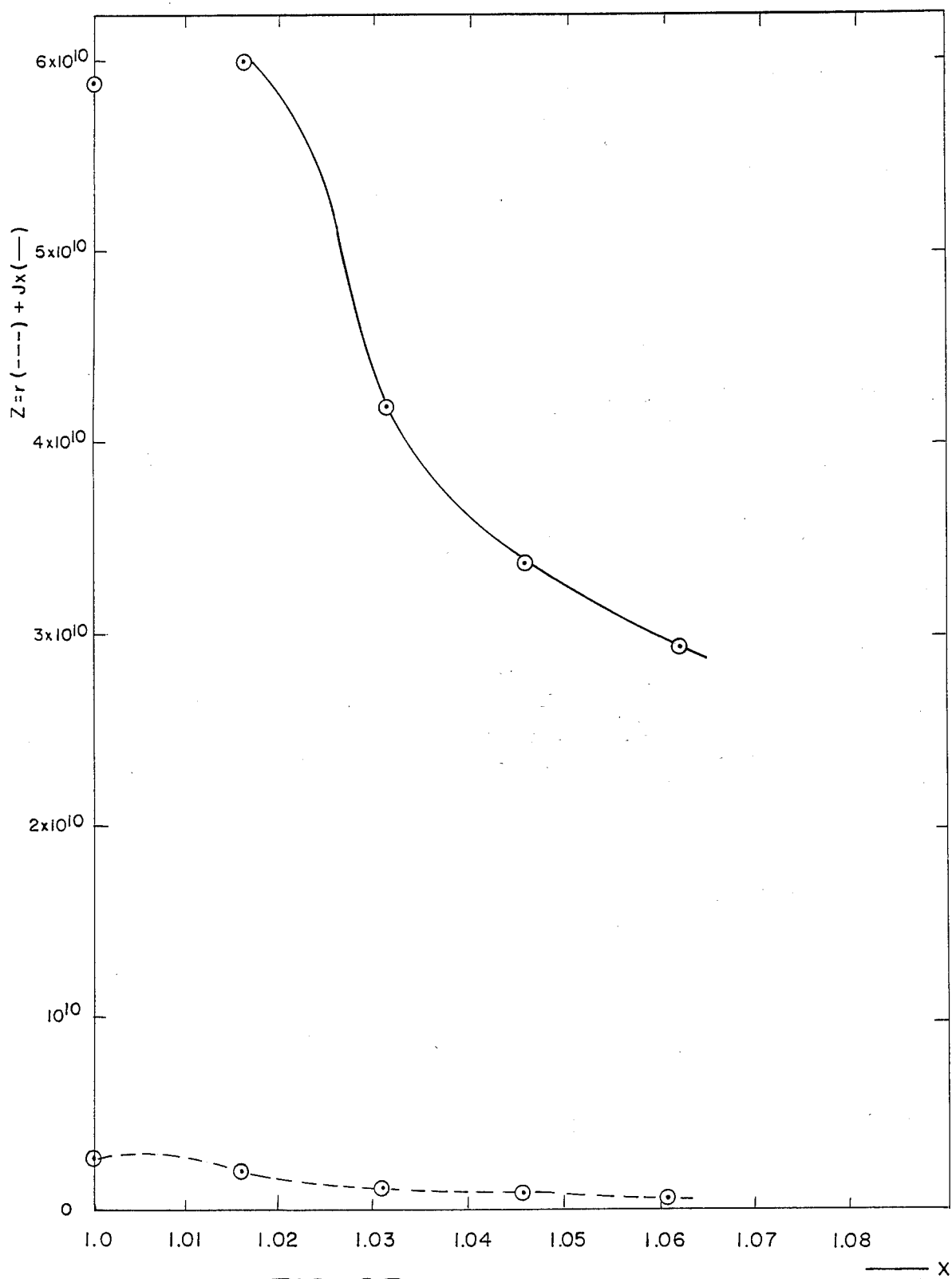
FIG. 23 shows mechanical impedance of a composite with both electrical impedance termination and feedback through the electrical termination.

The dashed curve on FIG. 21 is for the case of $G_{to} = 2 \times 10^8$ $f_o = 256$ Hz, m=13.7#. (Note that in $G_{to}$ here $Ag_{fs}$ is $2 \times 10^4$, a very modest value.) Note that $G_{to}$ is $20 \times W_o$ m. The gain A is assumed to be attenuated at much higher and much lower frequencies in such a way that stability is preserved.

If the feedback is removed, the plot is given by the solid-line curve (smaller circle). Note that there is a change in the scale of a factor of 10. The magnitude of $[-f(X)]$ is about 20 times that for the "no feedback" case for the range of X's shown.

In order to compare this composite with a conventional feedback device, the stiffness, s, of the spring was reduced by a factor of 10, thus reducing the antiresonant frequency by a factor of $\sqrt{10}$. Then, using the same other parameters as in example above, $$j(-X) = -\frac{\frac{w_o m}{\sqrt{10}} - jX\sqrt{10}\ G_t}{\frac{1}{jX\sqrt{10}} + j\sqrt{10}\ X},$$

which becomes j $22.3 \times 10^7$ at X=1. Thus, the composite device has an impedance magnitude at X=1 that is $\approx 235$ times aS great. In fact, the dynamic absorber alone is 11.2 times as good at the antiresonant frequency.

Generalization to the Case of a Changing Frequency. If the frequency of the disturbing force is slowly varying, the means delineated above will insure that the antiresonant frequency of the V.S. will follow it. The external electrical impedance $Z_e$ will adjust the current through the transducer to create a virtual mechanical element to add to the spring mass unit to adjust its antiresonant frequency to the new value.

The output of a power amplifier having a low electrical output impedance is inserted between $Z_e$ and ground. This is required to prevent the feedback means from interfering with the L.F.V.S. functions. It is excited by a signal generated by an accelerometer X mounted on the base. See FIG. 22.

For concreteness, a variable reluctance transducer, shown in FIG. 7, will be considered. The analysis of the vibrating system was based on that from prior art; most of the notation is also the same. The main modification involved the inclusion of feedback described above. The impedance of the device at the mounting point was put into the same form as for the elementary composite system above, except that f(w) must be given by (in terms of circular frequency w), $$f(w) = \frac{z_a\left(\frac{s \times s'}{jw} + \frac{G}{z_e + z_T}\right) + \frac{G}{10} jw \frac{v_o z_a}{z_e + z_t}}{z_a + \left(\frac{s \times s'}{jw} + \frac{G}{z_e + z_T}\right)}$$

where G is defined by $$G = G^2 \times 10^{-9},$$

and where $V_o$ is given by $$V_o = A_{fb} C_{acc},$$

where $A_{fb}$ is the (complex) gain of the feedback amplifier, and $C_{acc}$ is the accelerometer coefficient (and given here in Volts/cm/sec²).

As in the prior art, the condition for the optimum termination for a specific w of antiresonance is that $$z_a + \left(\frac{s \times s'}{jw} + \frac{G}{z_e + z_T}\right) = 0,$$

in the case of a lossless transducer and $Z_e$. This approximation is very good except in the denominator. There, mechanical and electromagnetic losses can be lumped into a mechanical resistance r which was determined impirically by determining the $Q_{oo}$) where $$Q_{oo} = \frac{z_a}{zv},$$

at a number of specific values of terminating capacitors. See FIG. 11, e.g. Then f(X) can be simplified and written in terms of a nondimensional frequency $$f(X) = W_o m_a X Q + Q_{oo} w_o X \frac{G}{10} V_j \left[ w_o m_a X - \frac{(s \times s')}{w_o X} \right]$$

Somewhat better measurement results are used in Table III:

TABLE III

| f | 258 | 262 | 266 | 270 | 274 |
|---|---|---|---|---|---|
| $C_e$ | ∞ | 3.81 µfd | 3.22 µfd | 2.03 µfr | 1.73 µfr |
| $\chi$ | 1 | 1.016 | 1.031 | 1.046 | 1.062 |
| $Q_{oo}$ | 320 | 262 | 154 | 108 | 81 |
| Re (cgs) | $2.38 \times 10^9$ | $1.98 \times 10^9$ | $1.18 \times 10^9$ | $8.40 \times 10^8$ | $6.40 \times 10^8$ |
| Im (c.g.f.) | $5.89 \times 10^{10}$ | $6.01 \times 10^{10}$ | $4.19 \times 10^{10}$ | $3.38 \times 10^{10}$ | $2.94 \times 10^{10}$ |
| Qe | 7920 | 7951 | 5462 | 4343 | 3721 |

These results were obtained with a transducer with an $f_o = 258$, $G = 1.116 \times 10^9$ Hz, $m_a = 10.1$ lbs, $s = 1.206 \times 10^{10}$ dynes/cm, $s^1 = 1.58 \times 10^9$ dynes/cm, Af $= 2 \times 10^4$, $C_{acc} = 40.8 \times 10^{-6}$ volts/cm/su. Then f(X) is give by $$f = 7.44 \times 10^6 X Q_{oo}(X) tj Q_{oo}(X)[1.403 \times 10^9 X^2 - 1.219 \times 10^9]$$
$$= Re + jgm$$

The results for Re(f) and Im(f) are given in the table and are also plotted on FIG. 22. The real part gives the impedance with feedback equal to zero; the imaginary part gives the impedance due to feedback. The feedback can be delayed in phase by 90° by introducing an integrating circuit in the electrical feedback loop. This would lessen the likelihood of having a resultant velocity spectrum with "ears."

To get an idea of how this compares with the conventional feedback scheme, let the stiffness s be reduced to $3.58 \times 10^9$. With the s' and $m_a$ the same as previously, the antiresonant frequency is 141 Hz. With the other parameters also the same, the impedance at 258 Hz, $$f = -j3.2 \times 10^6 + 7.44 \times 10^6 \times 17.4.$$

Note that here the impedance added because of feedback is resistive, and equal in magnetic to 17.4 times the magnitude of the mass reactance of the inertial mass. In contrast with this, the feedback contribution is equal to a mass reactance at X times an equivalent $Q_e$, i.e.

$$Z|_{v.s.f.b.} = j7.44 \times 10^6 X \times Q_e.$$

$Q_e$ is given in the bottom row of Table III. This very high Q does not define the sharpness of resonance for a given electrical termination; that is $Q_{oo}$, given in the fourth row as measured. This is also clear from the denominator of the expression for f(W) which is the only part of f(W) that varies much with w; it is what determines $Q_{oo}$ (when the resistive part is included). Thus at X=1, the V.S. has 18.4 times the magnitude of impedance of the conventional feedback device, and the composite device has 455 times.

A Composite with Quasifeedback. If the resistance of the antiresonant circuit were reduced, the $Q_{oo}$ would be increased. After all of the losses, both mechanical and electromagnetic, were reduced as much as was reasonable, a further increase in $Q_{oo}$ could be obtained by putting a negative resistance term in the denominator of f(W). This could be done in two ways, neither of which is feedback in a strict sense.

One means is to include a component of negative resistance in $Z_e$.

Another means is to use a pickup, an accelerometer, on $m_a$ (rather than the base, as above). Then f(w) of Sec. B is changed, with the second term in the numerator removed and added (without the factor of $Z_a$) in the denominator, i.e.

$$fw = \frac{z_a\left(\frac{s \times s'}{jw} + \frac{G}{z_e + z_T}\right)}{\left[\frac{s \times s'}{jw} + z_a + \frac{G}{z_a + z_T}\right] + r + \frac{\frac{G}{10}jwV_a}{z_e + z_T}}$$

where $V_a = a_{f.b.} \times c_{acc}$, impedance, and where a mechanical resistance r is inserted in the denominator, combining the real mechanical resistance of the antiresonant system with a virtual one due to the electromechanical losses. $A_h$, the gain of the "feedback" amplifier, whose output impedance is very low, times the pickup coefficient.

$Z_e$ is defined such that the bracketed term in the denominator is zero at the new antiresonant frequency. The numerator then becomes $-Z_a^2$ and the last term in the denominator becomes $$\frac{10^8}{G} V_a m_a[-w'^2 + w^2]$$

where $w^2$ is the circular antiresonant frequency for a spring $(s+s')$ and a mass $m_a$.

It results for $Z_e = \infty$, i.e., an open circuit. For $w > w'$, this term can be made negative by making $V_a$ negative, i.e., interchanging of the leads from the amplifier either in the imput or the output. If $w > w'$, the gain should be positive. In either case, the magnitude of the term should be less than r.

V. Push-Pull V.S.

In the analysis of the operation of a vibration suppressor (See Sec. I and II), a linearized form of the canonic equations for the electromechanical system is used. For this approximation to be legitimate, it is necessary that the amplitude of the alternating current in the coils be small compared with the ambient gap. Further nonlinearity is caused by the fact that a cyclical variation of the flux (in the magnet core) exhibits hysteresis for a sinusoidal variation in (here superimposed on a large, steady) magnetomotive force. These departures from linearity cause the production of harmonics in the vibrating system to be protected.

It is sometimes necessary to reduce the harmonic level, or to increase the vibratory force without exceeding the harmonic level obtained with the original vibratory force. An obvious way is to make the V.S. larger. A better way is to operate a pair of V.S.'s in push-pull—in both the mechanical and electromagnetic senses. FIG. 2 shows a V.S. mounted on one side of a plate which acts as a "foundation" whose vibration is to be suppressed. For the proper electrical termination at the frequency of the vibratory force, $v_b$ is nearly reduced to zero; the V.S. then produces a force on the foundation that is very nearly equal and opposite to the vibratory force, and the "backing mass" $m_a$ vibrates as if the force were transferred to it. If another identical V.S. were rotated 180° mounted on the other side of the plate i.e., in mirror symetry (with the vibratory force and the dc bias current still applied in the same way), the same would hold, except that the two a.c. currents (each measured relative to the positive sense of the bias current) would be out of phase. Also because of the asymetry of the core parts, the oscillation the gaps would be out of phase. The forces created by the two V.S.'s depend on the changes in the gaps and on the oscillatory currents. In each case, the force can be expressed in a Taylor expansion in the variables $\Delta g$ and i. Because of the symmetry described above, the terms having an even sum of the powers of the exponents will cancel, while the terms having sums of odd power will add.

Figure 7A:
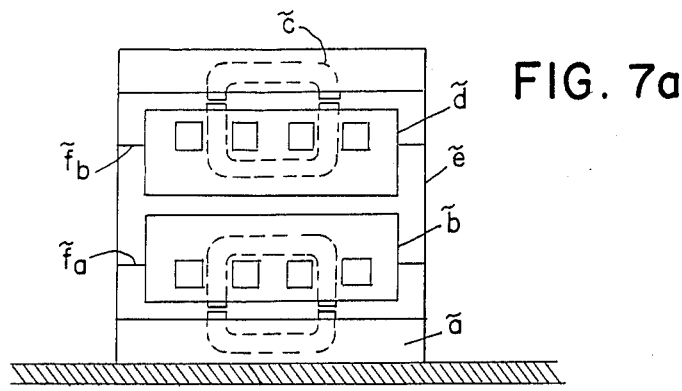
FIG. 7a transducers configured on either side of "base" suitable for a push-pull vibration suppressor system.

The push-pull mode can be obtained with two V.S.'s on the same side of the "foundation." The second V.S. must be arranged so that the magnetic core section fastened rigidly to the foundation is on the other side of the magnetic core mounted on the spring; thus the orientation of this transducer is the same as that of the transducer that had been put on the other side of the foundation, see FIG. 7a. This second V.S. can be put along side of the first, or they can be mounted in tandem as shown in FIG. 7a.

Here the short-legged core, the stator, is fastened to the foundation. Most of the core, and all of the coil masses are in the armature, have a total mass m, and are suspended on springs on the foundation next to the stator.

Figure 8A:
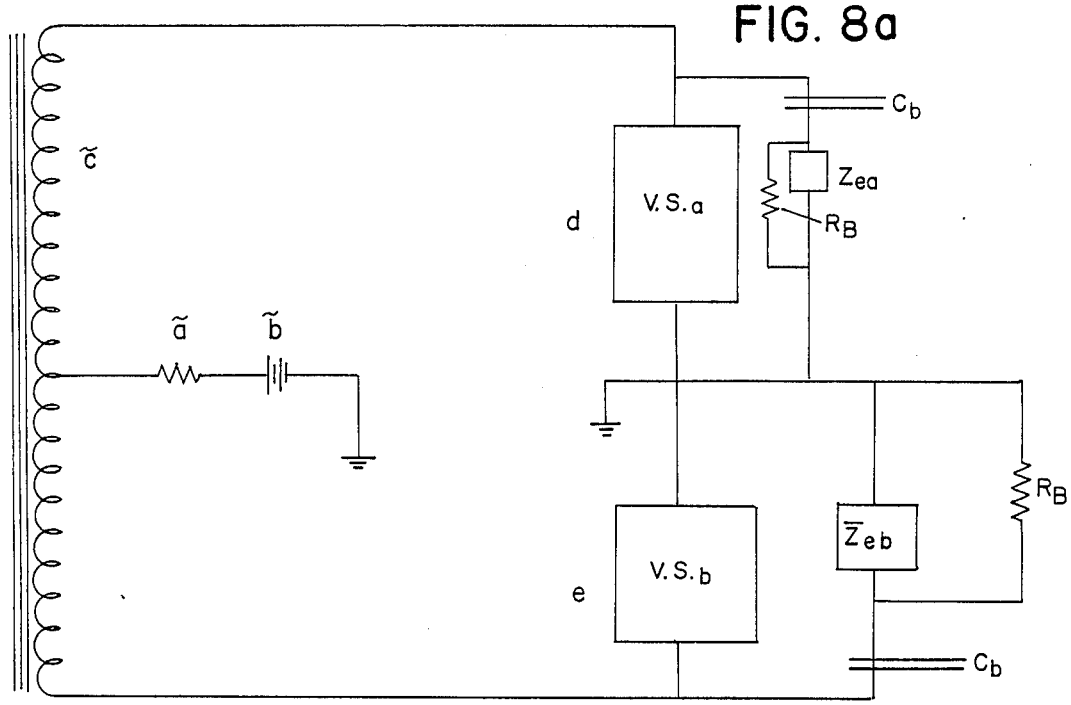
FIG. 8a is a circuit diagram of one means for providing a dc bias to the two transducers operating in push-pull so as to eliminate the need for a swinging choke.
Figure 8:
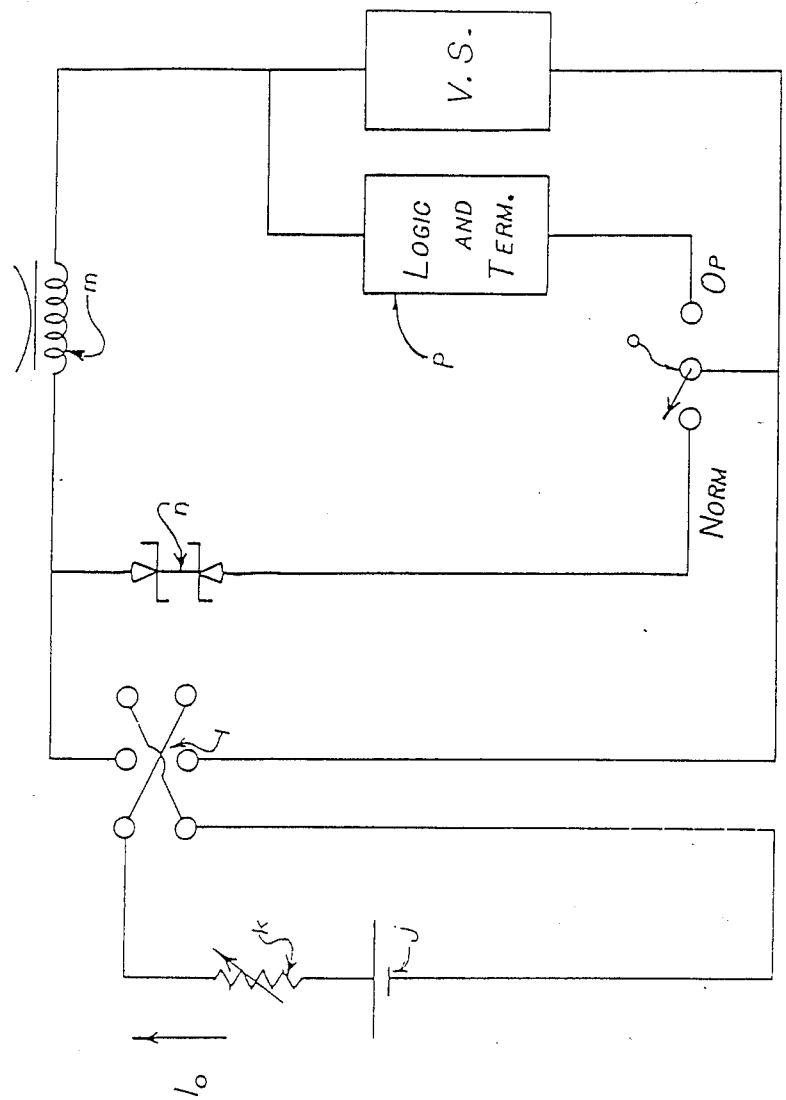
FIG. 8 is a circuit diagram of one means for providing a dc bias to the vibration suppression apparatus of the present invention.

Another object of the push-pull V.S. is to provide a simpler, cheaper and lighter means for providing the constant dc bias current required for linearized operation. As shown in FIG. 8, a swinging choke can be used to prevent the source of this current from significantly shunting the transducer (and the electrical termination $Z_e$). Alternative means, such as electronic-feedback constant-current source were indicated above. Here (see FIG. 8a) the battery $\bar{b}$ feeds the dc current through a rheostat $\bar{a}$ to the center-tap of an autotransformer $\bar{c}$. One end of the winding goes to the input of V.S. $\bar{d}$, while the other end goes to the input V.S.$_b\bar{e}$. If the C.T. autotransformer is very symmetrical and, if $\bar{d}$ and $\bar{e}$ are well matched, the net d.c. flux in $\bar{c}$ is nearly zero and thus the dynamic permeability is very high—much higher than for the cores of the transducer (if the same core material is used) because the latter must operate at a high dc flux bias. Further, because of the autotransformer action, each transducer is shunted by an inductance whose value is twice that obtained with only one-half of the winding in $\bar{c}$. Thus, an effective reactance shunting the transducer output can be obtained that is very large compared with that of $Z_{ea}$ or $_{eb}$. A swinging choke with even only one-tenth of this reactance would be very larger, and it could be dangerous because of the large amount of energy stored in its magnetic field.

Alternatively, let the autotransformer c be changed to a conventional transformer with a primary winding with $N_1$ and $N_2$ turns on either side of the center tap, see FIG. 8b. Let the secondary winding have $N_2$ turns. An impedance of the secondary load $$Z_{es} = \frac{Z_e}{2\left(\frac{N_1}{N_2}\right)^2}$$

puts an impedance of $Z_e$ across each $V_s$, $\bar{d}$ and $\tilde{e}$ transducers, and thus provides an alternative way to terminate the transducers.

In addition to being very effective in vibration suppression, the invention can also be the basis of push-pull low frequency acoustical underwater projector.

While the invention has been described with reference to specific embodiments, modifications and variations of the invention may be made without departing from the scope of the invention which is defined in the following claims.

I claim:

1. The method for suppressing vibration comprising
applying vibration to an electro-mechanical transducer,
sensing the frequency of vibration,
selecting a termination impedance capable of providing the transducer with a desired mechanical impedance at said frequency, and
automatically connecting circuit means having said termination impedance to the transducer, wherein the transducer converts said vibration into an electrical signal and the sensing comprises counting the axis crossings of said signal over a predetermined time interval.

2. The method for suppressing vibration comprising
applying vibration to an electro-mechanical transducer,
sensing the frequency of vibration,
selecting a termination impedance capable of providing the transducer with a desired mechanical impedance at said frequency, and
automatically connecting circuit means having said termination impedance to the transducer,
further comprising automatically shunting the circuit means at frequencies other than the resonant frequency thereby lowering the effective Q at said other frequencies and eliminating spurious resonance.

3. The method for suppressing vibration comprising
applying vibration to an electro-mechanical transducer,
sensing the frequency of vibration,
selecting a termination impedance capable of providing the transducer with a desired mechanical impedance at said frequency, and
automatically connecting circuit means having said termination impedance to the transducer,
further comprising automatically shunting the circuit means at resonant frequency thereby eliminating spurious resonances.

4. The method of claim 1 wherein the desired mechanical impedance is a high mechanical impedance.

5. The method of claim 1 wherein the termination impedance is the optimum impedance which produces the highest mechanical impedance at said frequency.

6. The method of claim 1 further comprising providing a composite of a vibration suppression system and a feedback system and enhancing the ability of either system to control vibration.

7. The method of claim 6 wherein the providing comprises providing a simple composite of a dynamic absorber, vibration suppression system and a feedback system and enhancing the capability to control vibration at and near a single frequency.

8. The method of claim 6 wherein the providing of feedback comprises providing virtual feedback for enhancing the apparent Q of the vibration suppression system.

9. The method of claim 1 further comprising providing a composite of the vibration suppression system and a feedback system for enhancing capability of controlling vibration caused by a force with a slowly varying frequency.

10. The method of claim 1 further comprising introducing a negative resistance in the electrical termination of a vibration supression system, thus increasing its Q for enhancing the capability of a vibration suppression system to control vibration.

11. The method of suppressing vibrations in a foundation, comprising:
mounting a pair of identical vibrations suppressor transducers on a foundation in an opposite sense, concurrently controlling the transducers;
providing two oppositely push-pull vibration suppression systems, thereby significantly reducing non-linear distortion;
providing a center-tapped autotransformer to provide dc flux bias current the two push-pull vibration suppression systems and nearly cancelling the dc flux bias in the autotransformer, thus providing higher ac impedance shunting the two vibration suppression systems.

12. The method of caim 11 wherein the mounting comprises putting identical vibration suppression systems back-to-back on the same side of the foundation in tandem arrangement.

13. The method of claim 11 further comprising providing a two-coil transformer, with one coil center-tapped and connected as in claim 11, and with the secondary coil connected to a load, and used simultaneously for providing a high ac impedance dc bias source, and proper electrical terminations to a pair of push-pull vibration suppression systems.

14. The method of claim 11 wherein the mounting comprises mounting identical vibration suppressors back-to-back in tandem arrangement on the same side of the foundation and joining backing masses together and mounting the backing masses on a single set of springs while minimizing coupling between two sets of cores.

15. The method of claim 1 wherein a running average of the number of axis crossings is made in a series of subintervals by adding the count from a new subinterval and dropping the count from the oldest subinterval, doing this once each subinterval.

16. The method of claim 1 wherein the termination means is specified by the digital output of the counter crossings, said output is used to extract from a memory a digital output, said memory output connects a number of capacitors from a digital set, and connects them across the transducer output.

17. The method of claim 11, wherein the mounting comprises mounting identical vibration suppressors back-to-back in tandem arrangement on the same side of the foundation and joining backing masses together and mounting the backing masses on a single set of springs while minimizing coupling between the back-to-back suppressors.

* * * * *